United States Patent
Xu et al.

(10) Patent No.: US 12,256,417 B2
(45) Date of Patent: Mar. 18, 2025

(54) RADIO RESOURCE ALLOCATION POLICY CONFIGURATION METHOD, APPARATUS, AND SYSTEM

(71) Applicant: HUAWEI TECHNOLOGIES CO., LTD., Guangdong (CN)

(72) Inventors: Ruiyue Xu, Shanghai (CN); Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 17/711,716

(22) Filed: Apr. 1, 2022

(65) Prior Publication Data
US 2022/0225334 A1   Jul. 14, 2022

Related U.S. Application Data

(63) Continuation of application No. PCT/CN2020/119575, filed on Sep. 30, 2020.

(30) Foreign Application Priority Data

Oct. 3, 2019   (WO) ................ PCT/CN2019/109819

(51) Int. Cl.
H04W 72/04   (2023.01)
H04W 24/08   (2009.01)
H04W 72/53   (2023.01)

(52) U.S. Cl.
CPC .......... *H04W 72/53* (2023.01); *H04W 24/08* (2013.01)

(58) Field of Classification Search
CPC . H04W 72/0493; H04W 72/53; H04W 72/29; H04W 24/08; H04W 28/0925; H04W 28/0864
See application file for complete search history.

(56) References Cited

U.S. PATENT DOCUMENTS 8,184,596 B2 *   5/2012   Karlsson ............... H04W 16/14
                                                     370/335
2017/0141973 A1 *   5/2017   Vrzic .................. H04L 47/2408
(Continued)

FOREIGN PATENT DOCUMENTS

CN   108293004 A   7/2018
CN   109196828 A   1/2019
(Continued)

OTHER PUBLICATIONS

3GPP TS 28.541 V16.2.0 (Sep. 2019), "3rd Generation Partnership Project; Technical Specification Group Services and System Aspects; Management and orchestration; 5G Network Resource Model (NRM); Stage 2 and stage 3 (Release 16)," Sep. 2019, 313 pages.
(Continued)

*Primary Examiner* — Rasheed Gidado
(74) *Attorney, Agent, or Firm* — Fish & Richardson P.C.

(57) ABSTRACT

The disclosure provides radio resource allocation policy configuration methods. One example method includes that a first network management unit obtains a first radio resource allocation policy which is used to describe a first proportion of a radio resource, available to each of one or more objects in a first subnetwork, to a first radio resource of the first subnetwork. The first network management unit determines a second radio resource allocation policy based on the first radio resource allocation policy, where the second radio resource allocation policy is used to describe a second proportion of a radio resource, available to each of one or more objects in a first cell, to a second radio resource of the first cell, the objects in the first cell include at least one object of the one or more objects, and the first cell is a cell of the first subnetwork.

20 Claims, 18 Drawing Sheets

(56) References Cited

U.S. PATENT DOCUMENTS

| | | | |
|---|---|---|---|
| 2019/0021108 A1* | 1/2019 | Hampel | H04W 72/535 |
| 2019/0104071 A1* | 4/2019 | Kobayashi | H04L 45/42 |

FOREIGN PATENT DOCUMENTS

| | | | |
|---|---|---|---|
| CN | 109714795 A | | 5/2019 |
| CN | 109842910 A | | 6/2019 |
| EP | 3416429 A1 | | 12/2018 |
| EP | 3471341 A1 | | 4/2019 |
| EP | 3678351 A1 | | 7/2020 |
| WO | 2018082545 A1 | | 5/2018 |
| WO | 2019062457 A1 | | 4/2019 |

OTHER PUBLICATIONS

Ericsson et al., "Analysis of SA2 scenarios on SLA fulfilment at NG-RAN," 3GPP TSG-RAN WG3 #103, R3-190678, Athens, Greece, Feb. 25-Mar. 1, 2019, 5 pages.

PCT International Search Report and Written Opinion issued in International Application No. PCT/CN2020/119575 on Dec. 31, 2020, 15 pages (with English translation).

PCT International Search Report and Written Opinion issued in International Application No. PCT/CN2019/109819 on May 26, 2020, 15 pages (with English translation).

Office Action in Chinese Appln. No. 201980096488.3, dated May 7, 2023, 7 pages.

China Mobile et al., "Solution for Key Issue 14: How to Ensure that Slice SLA is Guaranteed," SA WG2 Meeting #S2-129bis, S2-1812127, Oct. 26-30, 2018, West Palm Beach, Florida, USA, 5 pages.

3GPP TS 28.531 V16.2.0, "3rd Generation Partnership Project; Technical Specification Group Services and System Aspects; Management and Orchestration; Provisioning; (Release 16)," Jun. 2019, 65 pages.

Extended European Search Report in European Appln No. 20871439.4, dated Feb. 1, 2023, 16 pages.

* cited by examiner

RADIO RESOURCE ALLOCATION POLICY CONFIGURATION METHOD, APPARATUS, AND SYSTEM

CROSS-REFERENCE TO RELATED APPLICATIONS

This application is a continuation of International Application No. PCT/CN2020/119575, filed on Sep. 30, 2020, which claims priority to International Application No. PCT/CN2019/109819, filed on Oct. 3, 2019. The disclosures of the aforementioned applications are hereby incorporated by reference in their entireties.

TECHNICAL FIELD

Embodiments of this application relate to the field of communications technologies, and in particular, to a radio resource allocation policy configuration method, an apparatus, and a system.

BACKGROUND

With development of a communications network, three service types: enhanced mobile broadband (Enhanced Mobile Broadband, eMBB), ultra-reliable low-latency communication (Ultra-reliable low-latency communication, URLLC), and massive Internet of Things (Massive Internet of Thing, mIOT), as well as technologies such as an area network and a network slice, are introduced into a fifth generation (5G) mobile communications technology to implement flexible customization of a vertical industry in a network, thereby effectively ensuring service performance of the vertical industry in an operator network. For network operation and maintenance, how to flexibly schedule and allocate a radio resource to meet requirements of different vertical industries becomes a key challenge, for example, how to effectively allocate and schedule a radio resource to meet service level agreements (Service level agreements, SLAs) of different network slices.

Currently, a cell may support one or more network slices, and a base station may configure a resource occupation ratio for each of the one or more network slices of the cell. A radio resource available to each network slice in a radio resource of the cell may be determined based on the resource occupation ratio configured for the network slice. For example, as shown in FIG. 1, the cell supports a network slice 1 and a network slice 2. The base station supports an operator in specifying that the network slice 1 uses 40% of the radio resource and the network slice 2 uses 60% of the radio resource.

However, a network slice may provide a service for thousands of cells. As a result, each time a network slice is newly added, the base station needs to configure a radio resource allocation policy for each of the thousands of cells, to determine a proportion of a radio resource, available to the newly added network slice, to a radio resource of each of the thousands of cells. In this case, due to addition of the network slice, the base station further needs to re-determine a proportion of a radio resource, available to another network slice in each cell, to the radio resource of each of the thousands of cells. Consequently, workload of configuring a radio resource allocation policy for the cell increases, and this consumes time and is inefficient.

SUMMARY

Embodiments of this application provide a radio resource allocation policy configuration method, an apparatus, and a system, to simplify configuration of a radio resource allocation policy of a cell.

According to a first aspect, an embodiment of this application provides a radio resource allocation policy configuration method, including: A first network management unit obtains a first radio resource allocation policy. The first radio resource allocation policy is used to describe a first proportion of a radio resource, available to each of one or more objects in a first subnetwork, to a first radio resource of the first subnetwork, or the first radio resource allocation policy is used to describe a quantity of the radio resource available to each of the one or more objects in the first subnetwork. The first network management unit determines a second radio resource allocation policy based on the first radio resource allocation policy. The second radio resource allocation policy is used to describe a second proportion of a radio resource, available to each of one or more objects in a first cell, to a second radio resource of the first cell, or the second radio resource allocation policy is used to describe a quantity of the radio resources available to each of the objects in the first cell. The objects in the first cell include at least one object of the one or more objects, and the first cell is a cell of the first subnetwork.

This embodiment of this application provides a radio resource allocation policy configuration method. In this solution, the first radio resource allocation policy of the first subnetwork is introduced. Because the first radio resource allocation policy describes the first proportion of the radio resource, available to each of the one or more objects in the first subnetwork, to the first radio resource, or the first radio resource allocation policy is used to describe the quantity of the radio resource available to each of the one or more objects in the first subnetwork, the second proportion of each of the objects in the first cell or the quantity of radio resources available to each of the objects in the first cell may be determined based on the one or more objects described in the first radio resource allocation policy. In this way, when the first proportion of any of the one or more objects changes, this helps the first network management unit adjust radio resource allocation policies of different cells based on a real-time scenario, so that dynamicity is better and resource use efficiency is higher. In addition, in this solution, different first radio resources may be set for different subnetworks, which is simpler than a radio resource allocation policy of a cell.

In a possible implementation, the objects in the first cell are the same as the one or more objects, a second proportion that is of a first object in the objects in the first cell and that is in the second radio resource is the same as a first proportion of the first object in the first radio resource, and the first object is any of the objects in the first cell. When the objects in the first cell are the one or more objects described in the first radio resource policy, the first proportion of the one or more objects described in the first radio resource allocation policy may be directly determined as a second proportion of the one or more objects in the first cell.

In a possible implementation, the at least one object is all objects in the first cell, and that the first network management unit determines a second radio resource allocation policy based on the first radio resource allocation policy includes: The first network management unit determines a relative ratio between the objects in the first cell based on a first proportion of each of the at least one object; and the first network management unit determines a second proportion of each of the objects in the first cell based on the relative ratio between the objects in the first cell. When all the objects in the first cell are some objects (for example, at least one object) in the one or more cells, the relative ratio may be determined to determine the second proportion of each object in the first cell.

In a possible implementation, the objects in the first cell further include at least one second object in an object in a second subnetwork. The method provided in this embodiment of this application further includes: The first network management unit obtains a third radio resource allocation policy, where the third radio resource allocation policy is used to describe a third proportion that is of the object in the second subnetwork and that is in a third radio resource of the second subnetwork. That the first network management unit determines a second radio resource allocation policy based on the first radio resource allocation policy includes: The first network management unit determines a second proportion of each of the objects in the first cell based on a first proportion of each of the at least one object and the third proportion of the at least one second object.

In a possible implementation, the method provided in this embodiment of this application further includes: The first network management unit obtains performance indicators of some or all of the objects in the first cell, where the performance indicator includes any one or more of the following: a quantity of terminals, a quantity of registered terminals, a throughput, throughput distribution, a delay, and a quantity of radio resource control RRC connections. The first network management unit adjusts, based on the performance indicator of each of the some objects or all the objects, the second proportion of each of the objects in the first cell or the quantity of radio resources available to each of the objects in the first cell. In this way, when it is determined based on the first radio resource allocation policy that the second radio resource cannot be effectively used, the second proportion of each object or the quantity of radio resources available to each object is adjusted based on the performance indicator, to improve effective utilization of the second radio resource.

In a possible implementation, that the first network management unit adjusts, based on the performance indicator of each of the some objects or all the objects, the second proportion of each of the objects in the first cell or the quantity of radio resources available to each of the objects in the first cell includes: If the first network management unit determines, based on the performance indicators of the some objects or all the objects, that any object whose radio resource has effective utilization less than a first threshold exists in the some objects or all the objects, the first network management unit decreases a second proportion of the any object or a quantity of radio resources available to the any object; or if any object whose radio resource has effective utilization greater than a second threshold exists in the some objects or all the objects, the first network management unit increases a second proportion of the any object or a quantity of radio resources available to the any object.

In a possible implementation, the method provided in this embodiment of this application further includes: The first network management unit obtains a performance indicator of each of one or more objects in a second cell, where the second cell is also a cell of the first subnetwork. That the first network management unit adjusts, based on the performance indicator of each of the some objects or all the objects, the second proportion of each of the objects in the first cell or the quantity of radio resources available to each of the objects in the first cell includes: The first network management unit adjusts, based on the performance indicator of each of the some objects or all the objects and the performance indicator of each of the objects in the second cell, the second proportion of each of the objects in the first cell or the quantity of radio resources available to each of the objects in the first cell. In this way, radio resources can be coordinated between a plurality of cells.

In a possible implementation, that a first network management unit determines a first radio resource allocation policy includes: The first network management unit receives first information from a second network management unit, where the first information is used to determine the first radio resource allocation policy, and the first information is a radio resource allocation policy of the first subnetwork or the first information is an adjusted radio resource allocation policy; and the first network management unit determines the first radio resource allocation policy based on the first information.

In a possible implementation, the first information is the adjusted radio resource allocation policy, and before the first network management unit receives the first information from the second network management unit, the method provided in this embodiment of this application further includes: The first network management unit sends, to the second network management unit, a performance indicator of at least one object supported by the first subnetwork, where the performance indicator includes any one or more of the following: a quantity of terminals, a quantity of registered terminals, a throughput, throughput distribution, a delay, and a quantity of radio resource control RRC connections; and the second network management unit is configured to adjust the radio resource allocation policy based on the performance indicator of the at least one object. In this way, a second proportion of each object can be optimized.

In a possible implementation, that a first network management unit determines a first radio resource allocation policy includes: The first network management unit adjusts the radio resource allocation policy based on a performance indicator of at least one object supported by the first subnetwork; and the first network management unit determines the adjusted radio resource allocation policy as the first radio resource allocation policy. This helps the first network management unit autonomously adjusts the radio resource allocation policy, to optimize a second proportion of each object.

In a possible implementation, that the first network management unit adjusts the radio resource allocation policy based on a performance indicator of at least one object supported by the first subnetwork includes: The first network management unit determines utilization of the first radio resource based on the performance indicator of the at least one object; and if the utilization of the first radio resource is less than a third threshold, the first network management unit adjusts the radio resource allocation policy.

In a possible implementation, the object includes one or more sub-objects.

In a possible implementation, the method provided in this embodiment of this application further includes: The first network management unit sends the second radio resource allocation policy to a base station to which the first cell belongs, so that the base station configures the second radio resource allocation policy for the first cell.

According to a second aspect, an embodiment of this application provides a radio resource allocation policy configuration method, including: A second network management unit determines first information, where the first information is used to determine a first radio resource allocation policy; the first radio resource allocation policy is used to describe a first proportion of a radio resource, available to each of one or more objects in a first subnetwork, to a first radio resource of the first subnetwork, or the first radio resource allocation policy is used to describe a quantity of the radio resource available to each of the one or more objects in the first subnetwork; and the first information is a radio resource allocation policy of the first subnetwork or the first information is an adjusted radio resource allocation policy. The second network management unit sends the first information to a first network management unit.

In a possible implementation, the method provided in this embodiment of this application further includes: The second network management unit receives a fourth radio resource allocation policy from a first network in a service operation system, where the fourth radio resource allocation policy is at least used to determine a radio resource allocation policy, and the first network includes the first subnetwork. That the second network management unit determines first information includes: The second network management unit determines a radio resource allocation policy based on the fourth radio resource allocation policy.

In a possible implementation, the first information is the adjusted radio resource allocation policy, and before the second network management unit receives the fourth radio resource allocation policy from the first network in the service operation system, the method further includes: The second network management unit sends, to the service operation system, a performance indicator of at least one of an object supported by the first network.

In a possible implementation, the first information is the adjusted radio resource allocation policy, and the method provided in this embodiment of this application further includes: The second network management unit receives, from the first network management unit, a performance indicator of at least one object supported by the first subnetwork, where the performance indicator includes any one or more of the following: a quantity of terminals, a quantity of registered terminals, a throughput, throughput distribution, a delay, and a quantity of radio resource control RRC connections. That the second network management unit determines an adjusted radio resource allocation policy includes: The second network management unit adjusts the radio resource allocation policy based on the performance indicator of the at least one object to obtain the adjusted radio resource allocation policy.

In a possible implementation, that the second network management unit adjusts the radio resource allocation policy based on the performance indicator of the at least one object includes: The second network management unit adjusts the radio resource allocation policy if the second network management unit determines, based on the performance indicator of the at least one object, that utilization of the first radio resource is less than or equal to a fourth threshold or that any one or more objects whose performance indicators less than a preset performance threshold exist in the at least one object.

According to a third aspect, an embodiment of this application provides a radio resource allocation policy configuration method, including: A service operation system determines information used to determine a radio resource allocation policy. The service operation system sends, to a second network management unit, the information used to determine the radio resource allocation policy. The radio resource allocation policy is used to describe a proportion of a radio resource, available to each of one or more objects included in a first subnetwork, to a first radio resource, or the radio resource allocation policy is used to describe a quantity of the radio resource available to each of the one or more objects in the first subnetwork.

In a possible implementation, the information used to determine the radio resource allocation policy may be any one of the following: a fourth radio resource allocation policy of a first network, a radio resource allocation policy, an adjusted radio resource allocation policy, and an adjusted fourth radio resource allocation policy. The fourth radio resource allocation policy is at least used to determine the radio resource allocation policy.

In a possible implementation, the information used to determine the radio resource allocation policy is the adjusted fourth radio resource allocation policy, and the method provided in this embodiment of this application further includes: The service operation system receives a performance indicator of at least one of an object supported by the first network of the second network management unit. Correspondingly, that the service operation system determines the adjusted fourth radio resource allocation policy includes: The service operation system adjusts the fourth radio resource allocation policy based on the performance indicator of the at least one of the object supported by the first network, to obtain the adjusted fourth radio resource allocation policy.

In a possible implementation, the information used to determine the radio resource allocation policy is the adjusted radio resource allocation policy, and the method provided in this embodiment of this application further includes: The service operation system receives a performance indicator of at least one of an object supported by the first subnetwork of the second network management unit. Correspondingly, that the service operation system determines the adjusted radio resource allocation policy includes: The service operation system adjusts the radio resource allocation policy based on the performance indicator of the at least one of the object supported by the first subnetwork, to obtain the adjusted radio resource allocation policy.

According to a fourth aspect, an embodiment of this application provides a radio resource allocation policy configuration apparatus. The radio resource allocation policy configuration apparatus may implement the radio resource allocation policy configuration method described in any one of the first aspect or the possible implementations of the first aspect, and therefore, may also implement the beneficial effect in any one of the first aspect or the possible implementations of the first aspect. The radio resource allocation policy configuration apparatus may be a first network management unit, or may be an apparatus that can support the first network management unit in implementing any one of the first aspect or the possible implementations of the first aspect, for example, a chip applied to the first network management unit. The radio resource allocation policy configuration apparatus may implement the foregoing method by using software or hardware, or by executing corresponding software by hardware.

In one example, this embodiment of this application provides a radio resource allocation policy configuration apparatus, including: a processing unit, configured to determine a first radio resource allocation policy, where the first radio resource allocation policy is used to describe a first proportion of a radio resource, available to each of one or more objects in a first subnetwork, to a first radio resource of the first subnetwork, or the first radio resource allocation policy is used to describe a quantity of the radio resource available to each of the one or more objects in the first subnetwork. The processing unit is further configured to determine a second radio resource allocation policy based on the first radio resource allocation policy, where the second radio resource allocation policy is used to describe a second proportion of a radio resource, available to each of one or more objects in a first cell, to a second radio resource of the first cell, or the second radio resource allocation policy is used to describe a quantity of the radio resources available to each of the objects in the first cell; the objects in the first cell include at least one object of the one or more objects; and the first cell is a cell of the first subnetwork.

In a possible implementation, the objects in the first cell are the same as the one or more objects, a second proportion that is of a first object in the objects in the first cell and that is in the second radio resource is the same as a first proportion of the first object in the first radio resource, and the first object is any of the objects in the first cell.

In a possible implementation, the at least one object is all objects in the first cell, and the processing unit is configured to determine a relative ratio between the objects in the first cell based on a first proportion of each of the at least one object. In addition, the processing unit is configured to determine a second proportion of each of the objects in the first cell based on the relative ratio between the objects in the first cell.

In a possible implementation, the objects in the first cell further include at least one second object in an object in a second subnetwork, and the apparatus provided in this embodiment of this application further includes a communications unit, configured to obtain a third radio resource allocation policy, where the third radio resource allocation policy is used to describe a third proportion that is of the object in the second subnetwork and that is in a third radio resource of the second subnetwork. The processing unit is configured to determine a second proportion of each of the objects in the first cell based on a first proportion of each of the at least one object and the third proportion of the at least one second object.

In a possible implementation, the communications unit is further configured to obtain performance indicators of some or all of the objects in the first cell, where the performance indicator includes any one or more of the following: a quantity of terminals, a quantity of registered terminals, a throughput, throughput distribution, a delay, and a quantity of radio resource control RRC connections. The processing unit is further configured to adjust, based on the performance indicator of each of the some objects or all the objects, the second proportion of each of the objects in the first cell or the quantity of radio resources available to each of the objects in the first cell.

In a possible implementation, the processing unit is specifically configured to: if the processing unit determines, based on the performance indicators of the some objects or all the objects, that any object whose radio resource has effective utilization less than a first threshold exists in the some objects or all the objects, decrease a second proportion of the any object or a quantity of radio resources available to the any object. Alternatively, if any object whose radio resource has effective utilization greater than a second threshold exists in the some objects or all the objects, the processing unit is configured to increase a second proportion of the any object or a quantity of radio resources available to the any object.

In a possible implementation, the communications unit is further configured to obtain a performance indicator of each of one or more objects in a second cell, where the second cell is also a cell of the first subnetwork. The processing unit is configured to adjust, based on the performance indicator of each of the some objects or all the objects and the performance indicator of each of the objects in the second cell, the second proportion of each of the objects in the first cell or the quantity of radio resources available to each of the objects in the first cell.

In a possible implementation, the communications unit is further configured to receive first information from a second network management unit, where the first information is used to determine the first radio resource allocation policy, and the first information is a radio resource allocation policy of the first subnetwork or the first information is an adjusted radio resource allocation policy. The processing unit is specifically configured to determine the first radio resource allocation policy based on the first information.

In a possible implementation, the first information is the adjusted radio resource allocation policy, and the communications unit is further configured to send, to the second network management unit, a performance indicator of at least one object supported by the first subnetwork, where the performance indicator includes any one or more of the following: a quantity of terminals, a quantity of registered terminals, a throughput, throughput distribution, a delay, and a quantity of radio resource control RRC connections. The second network management unit is configured to adjust the radio resource allocation policy based on the performance indicator of the at least one object.

In a possible implementation, the processing unit is configured to: adjust the radio resource allocation policy based on a performance indicator of at least one object supported by the first subnetwork, and determine the adjusted radio resource allocation policy as the first radio resource allocation policy.

In a possible implementation, the processing unit is specifically configured to determine utilization of the first radio resource based on the performance indicator of the at least one object. If the utilization of the first radio resource is less than a third threshold, the processing unit is configured to adjust the radio resource allocation policy.

In a possible implementation, the object includes one or more sub-objects.

In a possible implementation, the communications unit in this embodiment of this application is further configured to send the second radio resource allocation policy to a base station to which the first cell belongs.

In another example, this embodiment of this application provides a radio resource allocation policy configuration apparatus. The radio resource allocation policy configuration apparatus may be a first network management unit, or may be a chip in the first network management unit. The radio resource allocation policy configuration apparatus may include a communications unit and a processing unit. When the radio resource allocation policy configuration apparatus is the first network management unit, the communications unit may be a communications interface. The radio resource allocation policy configuration apparatus may further include a storage unit. The storage unit may be a memory. The storage unit is configured to store computer program code, where the computer program code includes instructions. The processing unit may be a processor. The processing unit executes the instructions stored in the storage unit, so that the first network management unit implements the communication method described in any one of the first aspect or the possible implementations of the first aspect. When the radio resource allocation policy configuration apparatus is the chip in the first network management unit, the processing unit may be a processor, and the communications unit may be collectively referred to as a communications interface. For example, the communications interface may be an input/output interface, a pin, a circuit, or the like. The processing unit executes the computer program code stored in the storage unit, so that the first network management unit implements the radio resource allocation policy configuration method described in any one of the first aspect or the possible implementations of the first aspect. The storage unit may be a storage unit (for example, a register or a cache) in the chip, or may be a storage unit (for example, a read-only memory or a random access memory) located outside the chip in the first network management unit.

Optionally, the processor, the communications interface, and the memory are coupled to each other.

According to a fifth aspect, an embodiment of this application provides a radio resource allocation policy configuration apparatus. The radio resource allocation policy configuration apparatus may implement the radio resource allocation policy configuration method described in any one of the second aspect or the possible implementations of the second aspect, and therefore, may also implement the beneficial effect in any one of the second aspect or the possible implementations of the second aspect. The radio resource allocation policy configuration apparatus may be a first network management unit, or may be an apparatus that can support the second network management unit in implementing any one of the second aspect or the possible implementations of the second aspect, for example, a chip applied to the second network management unit. The radio resource allocation policy configuration apparatus may implement the foregoing method by using software or hardware, or by executing corresponding software by hardware.

In one example, this embodiment of this application provides a radio resource allocation policy configuration apparatus, including: a processing unit, configured to determine first information used to determine a first radio resource allocation policy, where the first radio resource allocation policy is used to describe a first proportion of a radio resource, available to each of one or more objects in a first subnetwork, to a first radio resource of the first subnetwork, or the first radio resource allocation policy is used to describe a quantity of the radio resource available to each of the one or more objects in the first subnetwork; and the first information is a radio resource allocation policy of the first subnetwork or the first information is an adjusted radio resource allocation policy; and a communications unit, configured to send the first information to a first network management unit.

In a possible implementation, the communications unit is further configured to receive a fourth radio resource allocation policy from a first network in a service operation system, where the fourth radio resource allocation policy is at least used to determine a radio resource allocation policy, and the first network includes the first subnetwork. The processing unit is configured to determine the radio resource allocation policy based on the fourth radio resource allocation policy.

In a possible implementation, the first information is the adjusted radio resource allocation policy, and the communications unit is further configured to: before receiving the fourth radio resource allocation policy from the first network in the service operation system, send, to the service operation system, a performance indicator of at least one of an object supported by the first network.

In a possible implementation, the first information is the adjusted radio resource allocation policy, and the communications unit is further configured to receive, from the first network management unit, a performance indicator of at least one object supported by the first subnetwork, where the performance indicator includes any one or more of the following: a quantity of terminals, a quantity of registered terminals, a throughput, throughput distribution, a delay, and a quantity of radio resource control RRC connections. The processing unit is configured to adjust the radio resource allocation policy based on the performance indicator of the at least one object to obtain the adjusted radio resource allocation policy.

In a possible implementation, the processing unit is configured to adjust the radio resource allocation policy if the processing unit determines, based on the performance indicator of the at least one object, that utilization of the first radio resource is less than or equal to a fourth threshold or that any one or more objects whose performance indicators less than a preset performance threshold exist in the at least one object.

In another example, this embodiment of this application provides a radio resource allocation policy configuration apparatus. The radio resource allocation policy configuration apparatus may be a second network management unit, or may be a chip in the second network management unit. The radio resource allocation policy configuration apparatus may include a communications unit and a processing unit. When the radio resource allocation policy configuration apparatus is the second network management unit, the communications unit may be a communications interface. The radio resource allocation policy configuration apparatus may further include a storage unit. The storage unit may be a memory. The storage unit is configured to store computer program code, where the computer program code includes instructions. The processing unit may be a processor. The processing unit executes the instructions stored in the storage unit, so that the second network management unit implements the communication method described in any one of the second aspect or the possible implementations of the second aspect. When the radio resource allocation policy configuration apparatus is the chip in the second network management unit, the processing unit may be a processor, and the communications unit may be collectively referred to as a communications interface. For example, the communications interface may be an input/output interface, a pin, a circuit, or the like. The processing unit executes the computer program code stored in the storage unit, so that the second network management unit implements the radio resource allocation policy configuration method described in any one of the second aspect or the possible implementations of the second aspect. The storage unit may be a storage unit (for example, a register or a cache) in the chip, or may be a storage unit (for example, a read-only memory or a random access memory) located outside the chip in the second network management unit.

Optionally, the processor, the communications interface, and the memory are coupled to each other.

According to a sixth aspect, an embodiment of this application provides a radio resource allocation policy configuration apparatus. The radio resource allocation policy configuration apparatus may implement the radio resource allocation policy configuration method described in any one of the third aspect or the possible implementations of the third aspect, and therefore, may also implement the beneficial effect in any one of the third aspect or the possible implementations of the third aspect. The radio resource allocation policy configuration apparatus may be a service operation system, or may be an apparatus that can support the service operation system in implementing any one of the third aspect or the possible implementations of the third aspect, for example, a chip applied to the service operation system. The radio resource allocation policy configuration apparatus may implement the foregoing method by using software or hardware, or by executing corresponding software by hardware.

In one example, this embodiment of this application provides a radio resource allocation policy configuration apparatus, including: a communications unit, configured to determine information used to determine a radio resource allocation policy; and a communications unit, configured to send, to a second network management unit, the information used to determine the radio resource allocation policy. The radio resource allocation policy is used to describe a proportion of a radio resource, available to each of one or more objects included in a first subnetwork, to a first radio resource, or the radio resource allocation policy is used to describe a quantity of the radio resource available to each of the one or more objects in the first subnetwork.

In a possible implementation, the information used to determine the radio resource allocation policy may be any one of the following: a fourth radio resource allocation policy of a first network, a radio resource allocation policy, an adjusted radio resource allocation policy, and an adjusted fourth radio resource allocation policy. The fourth radio resource allocation policy is at least used to determine the radio resource allocation policy.

In a possible implementation, the information used to determine the radio resource allocation policy is the adjusted fourth radio resource allocation policy, and the communications unit is further configured to receive a performance indicator of at least one of an object supported by the first network of the second network management unit. Correspondingly, the processing unit is specifically configured to adjust the fourth radio resource allocation policy based on the performance indicator of the at least one of the object supported by the first network, to obtain the adjusted fourth radio resource allocation policy.

In a possible implementation, the information used to determine the radio resource allocation policy is the adjusted radio resource allocation policy, and the communications unit is further configured to receive a performance indicator of at least one of an object supported by the first subnetwork of the second network management unit. Correspondingly, the processing unit is configured to adjust the radio resource allocation policy based on the performance indicator of the at least one of the object supported by the first subnetwork, to obtain the adjusted radio resource allocation policy.

In another example, this embodiment of this application provides a radio resource allocation policy configuration apparatus. The radio resource allocation policy configuration apparatus may be a service operation system, or may be a chip in the service operation system. The radio resource allocation policy configuration apparatus may include a communications unit and a processing unit. When the radio resource allocation policy configuration apparatus is the service operation system, the communications unit may be a communications interface. The radio resource allocation policy configuration apparatus may further include a storage unit. The storage unit may be a memory. The storage unit is configured to store computer program code, where the computer program code includes instructions. The processing unit may be a processor. The processing unit executes the instructions stored in the storage unit, so that the service operation system implements the communication method described in any one of the third aspect or the possible implementations of the third aspect. When the radio resource allocation policy configuration apparatus is the chip in the service operation system, the processing unit may be a processor, and the communications unit may be collectively referred to as a communications interface. For example, the communications interface may be an input/output interface, a pin, a circuit, or the like. The processing unit executes the computer program code stored in the storage unit, so that the service operation system implements the radio resource allocation policy configuration method described in any one of the third aspect or the possible implementations of the third aspect. The storage unit may be a storage unit (for example, a register or a cache) in the chip, or may be a storage unit (for example, a read-only memory or a random access memory) located outside the chip in the service operation system.

Optionally, the processor, the communications interface, and the memory are coupled to each other.

According to a seventh aspect, an embodiment of this application provides a computer-readable storage medium. The computer-readable storage medium stores a computer program or instructions. When the computer program or the instructions are run on a computer, the computer performs the radio resource allocation policy configuration method described in any one of the first aspect or the possible implementations of the first aspect.

According to an eighth aspect, an embodiment of this application provides a computer-readable storage medium. The computer-readable storage medium stores a computer program or instructions. When the computer program or the instructions are run on a computer, the computer performs the radio resource allocation policy configuration method described in any one of the second aspect or the possible implementations of the second aspect.

According to a ninth aspect, an embodiment of this application provides a computer-readable storage medium. The computer-readable storage medium stores a computer program or instructions. When the computer program or the instructions are run on a computer, the computer performs the radio resource allocation policy configuration method described in any one of the third aspect or the possible implementations of the third aspect.

According to a tenth aspect, an embodiment of this application provides a computer program product including instructions. When the instructions are run on a computer, the computer performs the radio resource allocation policy configuration method described in any one of the first aspect or the possible implementations of the first aspect.

According to an eleventh aspect, an embodiment of this application provides a computer program product including instructions. When the instructions are run on a computer, the computer performs the radio resource allocation policy configuration method described in any one of the second aspect or the possible implementations of the second aspect.

According to a twelfth aspect, an embodiment of this application provides a computer program product including instructions. When the instructions are run on a computer, the computer performs the radio resource allocation policy configuration method described in any one of the third aspect or the possible implementations of the third aspect.

According to a thirteenth aspect, an embodiment of this application provides a communications system. The communications system includes the apparatus described in the fourth aspect or the possible implementations of the fourth aspect, and the apparatus described in the fifth aspect or the possible implementations of the fifth aspect.

In an optional implementation, the communications system may further include the apparatus described in the sixth aspect or the possible implementations of the sixth aspect.

For example, in the communications system, the second network management unit determines a radio resource allocation policy. The second network management unit sends, to the first network management unit, information used to determine a first radio resource allocation policy. The first network management unit determines the first radio resource allocation policy based on the information used to determine the first radio resource allocation policy. The first network management unit determines a second radio resource allocation policy based on the first radio resource allocation policy.

In a possible implementation, that the service operation system sends the information used to determine a radio resource allocation policy to the second network management unit, and the second network management unit determines the radio resource allocation policy is specifically: The second network management unit determines the radio resource allocation policy based on the information used to determine the radio resource allocation policy.

For specific steps performed by the apparatuses in the communications system, refer to descriptions in corresponding places. Details are not described herein again.

According to a fourteenth aspect, an embodiment of this application provides a communications apparatus. The communications apparatus includes a processor and a storage medium. The storage medium stores instructions. When the instructions are run by the processor, the method described in the first aspect or the possible implementations of the first aspect is implemented.

According to a fifteenth aspect, an embodiment of this application provides a communications apparatus. The communications apparatus includes a processor and a storage medium. The storage medium stores instructions. When the instructions are run by the processor, the method described in the second aspect or the possible implementations of the second aspect is implemented.

According to a sixteenth aspect, an embodiment of this application provides a communications apparatus. The communications apparatus includes a processor and a storage medium. The storage medium stores instructions. When the instructions are run by the processor, the method described in the third aspect or the possible implementations of the third aspect is implemented.

According to a seventeenth aspect, an embodiment of this application provides a communications apparatus, including at least one processor and a communications interface. The at least one processor and the communications interface are interconnected through a line. The at least one processor is coupled to a memory, and the memory is configured to store a computer program or instructions. The at least one processor is configured to execute the computer program or the instructions in the memory, so that the communications apparatus performs the method described in the first aspect or the possible implementations of the first aspect.

According to an eighteenth aspect, an embodiment of this application provides a communications apparatus, including at least one processor and a communications interface. The at least one processor and the communications interface are interconnected through a line. The at least one processor is coupled to a memory, and the memory is configured to store a computer program or instructions. The at least one processor is configured to execute the computer program or the instructions in the memory, so that the communications apparatus performs the method described in the second aspect or the possible implementations of the second aspect.

According to a ninth aspect, an embodiment of this application provides a communications apparatus, including at least one processor and a communications interface. The at least one processor and the communications interface are interconnected through a line. The at least one processor is coupled to a memory, and the memory is configured to store a computer program or instructions. The at least one processor is configured to execute the computer program or the instructions in the memory, so that the communications apparatus performs the method described in the third aspect or the possible implementations of the third aspect.

In a possible implementation, the apparatus described in any one of the seventeenth aspect, the eighteenth aspect, and the nineteenth aspect may further include a memory.

According to a twentieth aspect, an embodiment of this application provides a chip. The chip includes at least one processor and a communications interface, and the communications interface is coupled to the at least one processor. The at least one processor is configured to run a computer program or instructions to implement the method described in the first aspect or the possible implementations of the first aspect. The communications interface is configured to communicate with another module outside the chip.

According to a twenty-first aspect, an embodiment of this application provides a chip. The chip includes at least one processor and a communications interface, and the communications interface is coupled to the at least one processor. The at least one processor is configured to run a computer program or instructions to implement the method described in the second aspect or the possible implementations of the second aspect. The communications interface is configured to communicate with another module outside the chip.

According to a twenty-second aspect, an embodiment of this application provides a chip. The chip includes at least one processor and a communications interface, and the communications interface is coupled to the at least one processor. The at least one processor is configured to run a computer program or instructions to implement the method described in the third aspect or the possible implementations of the third aspect. The communications interface is configured to communicate with another module outside the chip.

The chip provided in this embodiment of this application may further include a memory, and the memory is configured to store a computer program or instructions.

According to a twenty-third aspect, an embodiment of this application provides a communications apparatus. The communications apparatus includes one or more modules, configured to implement the methods in the first aspect, the second aspect, and the third aspect, and the one or more modules may correspond to steps in the methods in the first aspect, the second aspect, and the third aspect.

According to a twenty-fourth aspect, an embodiment of this application provides a communications apparatus, including at least one processor. The at least one processor is coupled to a memory, and the memory is configured to store a computer program or instructions. The at least one processor is configured to execute the computer program or the instructions in the memory, so that the communications apparatus performs the communication method described in the first aspect or the possible implementations of the first aspect.

According to a twenty-fifth aspect, an embodiment of this application provides a communications apparatus, including at least one processor. The at least one processor is coupled to a memory, and the memory is configured to store a computer program or instructions. The at least one processor is configured to execute the computer program or the instructions in the memory, so that the communications apparatus performs the communication method described in the second aspect or the possible implementations of the second aspect.

According to a twenty-sixth aspect, an embodiment of this application provides a communications apparatus, including at least one processor. The at least one processor is coupled to a memory, and the memory is configured to store a computer program or instructions. The at least one processor is configured to execute the computer program or the instructions in the memory, so that the communications apparatus performs the communication method described in the third aspect or the possible implementations of the third aspect.

For beneficial effects of the second aspect to the twenty-sixth aspect and the implementations thereof in this application, refer to analysis of beneficial effects of the first aspect and the implementations thereof. Details are not described herein again.

DESCRIPTION OF EMBODIMENTS

Figure 1:
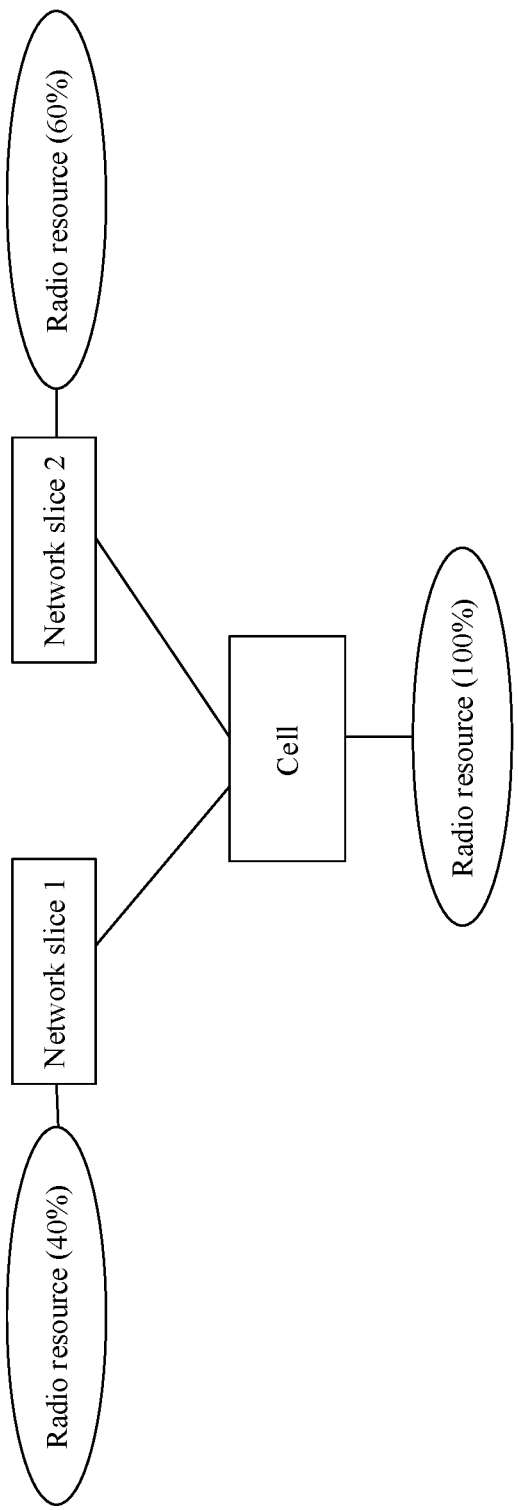
FIG. 1 is a schematic diagram of radio resource allocation occupation ratios of a network slice 1 and a network slice 2 of a cell.

To clearly describe the technical solutions in the embodiments of this application, terms such as "first" and "second" are used in the embodiments of this application to distinguish between same items or similar items that have basically same functions and purposes. For example, a first radio resource and a second radio resource are merely used to distinguish between different radio resources, and a sequence of the first radio resource and the second radio resource is not limited. A person skilled in the art may understand that the terms such as "first" and "second" do not limit a quantity or an execution sequence, and the terms such as "first" and "second" do not indicate a definite difference.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a relative concept in a specific manner.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of a network architecture and emergence of a new service scenario, the technical solutions provided in the embodiments of this application are also applicable to a similar technical problem.

In this application, "at least one" refers to one or more, and "a plurality of" refers to two or more. The term "and/or" describes an association relationship for describing associated objects and represents that three relationships may exist. For example, A and/or B may indicate the following cases: A exists alone, both A and B exist, and B exists alone, where A and B may be singular or plural. The character "/" usually indicates an "or" relationship between the associated objects. "At least one of the following items (pieces)" or a similar expression thereof means any combination of these items, including any combination of singular items (pieces) or plural items (pieces). For example, at least one (piece) of a, b, or c may indicate a, b, c, a and b, a and c, b and c, or a, b, and c, where a, b, and c may be singular or plural.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to a similar technical problem. The embodiments of this application are described by using an example in which a provided method is applied to an NR system or a 5G network.

Before the embodiments of this application are described, names in this application are first described below.

(1) Spectrum resource: A radio spectrum resource is also referred to as a frequency resource, which usually refers to a long wave, a medium wave, a short wave, an ultra-short wave, and a microwave, and usually refers to a general name of a radio frequency for transmitting a radio wave in a frequency range ranging from 9 kHz to 3000 GHz. The radio frequency is in units of Hz (hertz), and is expressed as follows:

a radio frequency less than 3000 kHz (including 3000 kHz) is represented by kHz (kilohertz);

a radio frequency greater than 3 MHz and less than or equal to 3000 MHz (including 3000 MHz) is represented by MHz (megahertz); and a radio frequency greater than 3 GHz and less than or equal to 3000 GHz (including 3000 GHz) is represented by GHz (gigahertz).

(2) Network slice: The network slice is a communications resource that ensures that a bearer service meets a service level agreement (Service level agreement, SLA) requirement. Hard isolation (physical isolation) or soft isolation may be performed on these resources based on different requirements. It may be considered that a network slice is a combination of a network function and a resource that are required to complete a service (or some services), and is a complete logical network.

(3) Subnetwork: The subnetwork is a set of network function instances obtained through division based on a specific purpose (for example, a management purpose).

(4) Area network: The area network is a set of network function instances in a specific area and management and control of a resource in the set.

Figure 2:
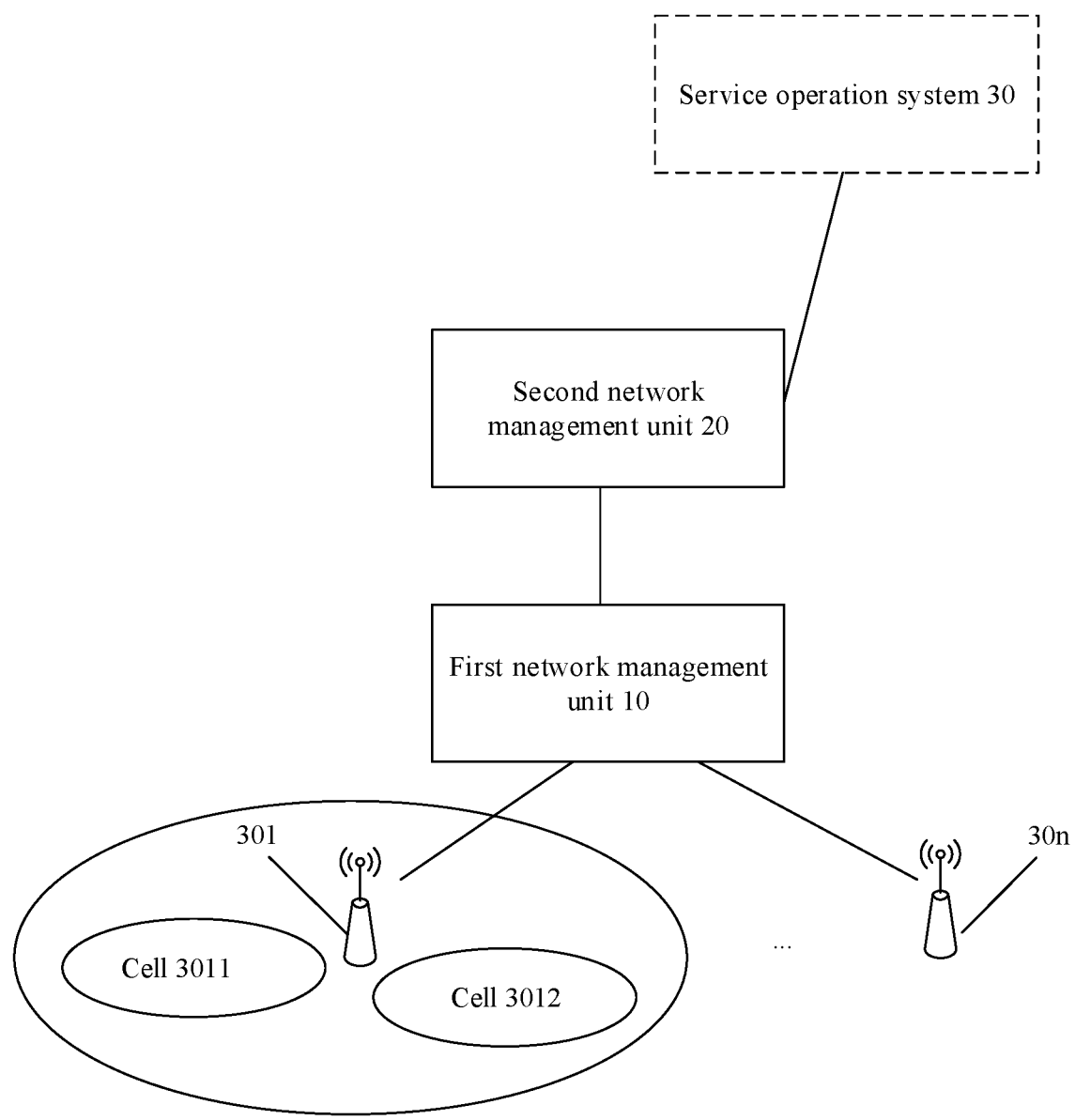
FIG. 2 is a schematic diagram of an architecture of a communications system according to an embodiment of this application.

As shown in FIG. 2, an embodiment of this application provides a communications system to which a radio resource allocation policy configuration method is applicable, including a first network management unit 10 and a second network management unit 20. The first network management unit 10 is configured to manage one or more network elements. In FIG. 2, that a network element is an access network element is used as an example, for example, an access network element 301 to an access network element 30n.

For example, the network element is an entity that provides a network service. For example, the network element may be an access network element, a centralized unit control plane (central unit control plane, CU-CP), a centralized unit (central unit, CU), a distributed unit (distributed unit, DU), a centralized unit user plane (central unit user plane, CU-UP), or a core network element. For example, the access network element may be an access network device (for example, an access network (access network, AN)), which may also be referred to as a radio access network (radio access network, RAN) device, for example, a next generation node base station (next generation node base station, gNB) in a 5G system or an evolved NodeB (evolved Node B, eNB) in a Long Term Evolution (long term evolution, LTE) system. For example, the core network element may be any one or more of an access and mobility management function (access and mobility management function, AMF) network element and a session management function (session management function, SMF) network element in a fifth generation (5th generation, 5G) core network (core network, CN).

Each access network element may cover one or more cells (Cells). For example, the access network element 301 covers a cell 3011 and a cell 3012.

The second network management unit 20 may also be referred to as an end-to-end network management system. The end-to-end network management system provides network operation and maintenance functions, including network lifecycle management, network deployment, network fault management, network performance management, network configuration management, network assurance, a network optimization function, and the like. The network herein may include one or more network elements or subnetworks.

For example, the end-to-end network management system may be a network management (network manager, NM) system, a cross-domain network management system (cross-domain network management function), an operations support system (operations support system, OSS), a network slice management (network slice management function, NSMF) system, a network management data analytical module (management data analytical function, MDAF), or a self-organization network function (self-organization network (SON) function, SON Function).

The first network management unit 10 may also be referred to as a domain network management system. The domain network management system provides one or all of the following functions: an intra-domain network operation and maintenance function and a network control function.

The intra-domain network operation and maintenance function, that is, an operation and maintenance function of a subnetwork or a network element, includes lifecycle management of the subnetwork or the network element, deployment of the subnetwork or the network element, fault management of the subnetwork or the network element, performance management of the subnetwork or the network element, assurance of the subnetwork or the network element, an optimization function of the subnetwork or the network element, and the like. The subnetwork herein includes one or more network elements. The domain herein may be a technical domain (including a radio access network domain, a transmission network domain, or a core network domain), a vendor domain (all network devices in the domain are from a same vendor), or a geographic area (a network in a specific geographic area).

The network control function is responsible for autonomous management, control, and analysis of a radio resource in a specific range (for example, a geographic area), and externally exposing a network that meets a radio traffic scenario of a specific user group.

For example, the domain network management system may be a network slice subnet management system (network slice subnet management function, NSSMF), a subnetwork management system (subnetwork management function, SMF), a domain management system (domain manager, DM), a network element management system (element manager, EM), a domain management data analytic function (management data analytic function, MDAF), a radio intelligent controller (RAN intelligent controller, RIC), a radio external controller (RAN External Controller), an application controller (application controller, APPC), or a mobile network automation engine (mobile automation engine, MAE).

For example, the first network management unit 10 may obtain or adjust a first radio resource allocation policy of a first subnetwork, and determine a second radio resource allocation policy of a first cell based on the first radio resource allocation policy. In addition, the first network management unit 10 may further adjust a second proportion of each object in a second object set described in the second radio resource allocation policy, or a quantity of radio resources available to each object in the second object set.

In a possible implementation, as shown in FIG. 2, the communications system may further include a service operation system 30. The service operation system 30 provides service operation functions, including service provisioning, service assurance, service scheduling, user management, and another function. For example, the service operation system 30 may determine or adjust a radio resource allocation policy of a first network, and send a determined radio resource allocation policy or an adjusted radio resource allocation policy of the first network to the second network management unit 20. The service operation system 30 includes a service operation system of a vertical industry or a service operation system of an operator, for example, a business support system (business support system, BSS) or a communications service management function (communication service management function, CSMF).

Figure 3:
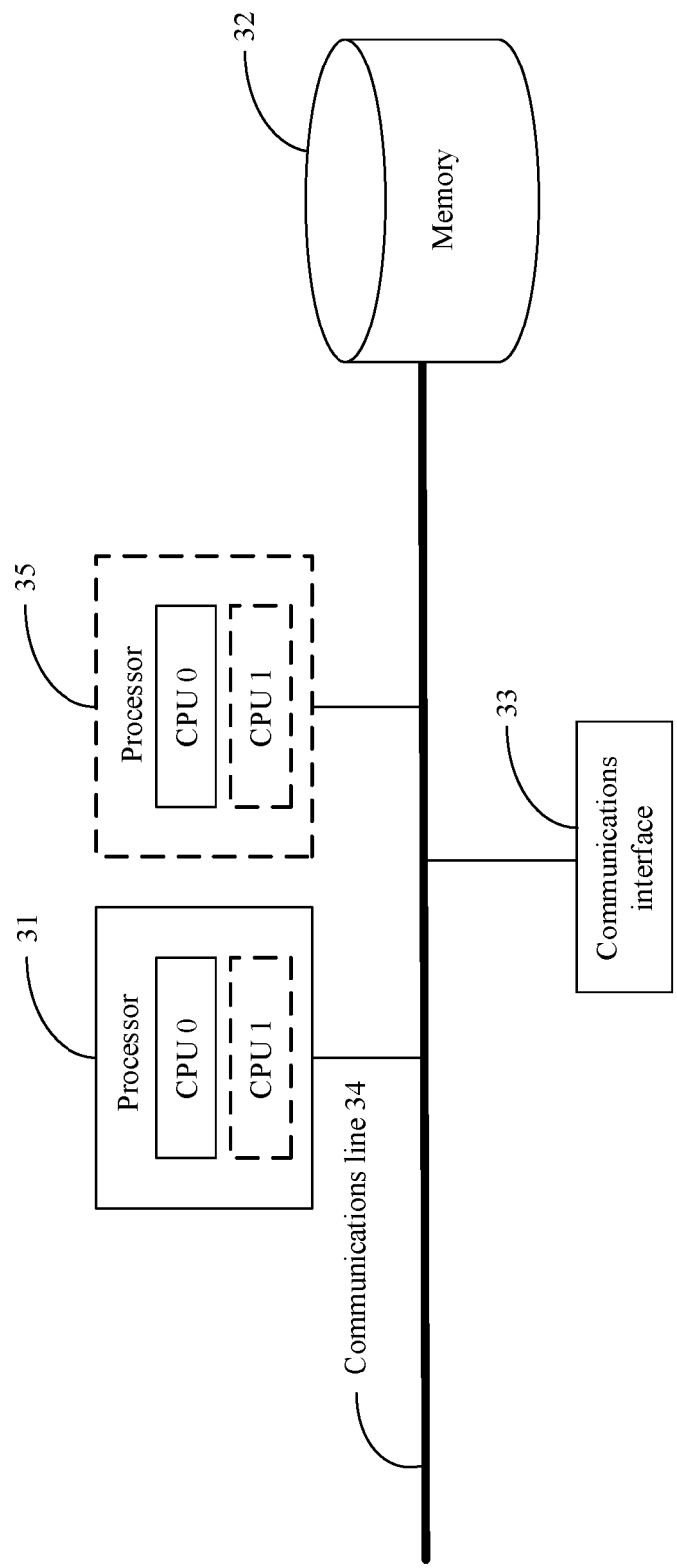
FIG. 3 is a schematic diagram of a structure of a communications device according to an embodiment of this application.

FIG. 3 is a schematic diagram of a hardware structure of a communications device according to an embodiment of this application. For hardware structures of the first network management unit 10, the second network management unit 20, and the service operation system 30 in the embodiments of this application, refer to the schematic diagram of the hardware structure of the communications device shown in FIG. 3. The communications device includes a processor 31, a communications line 34, and at least one communications interface (a communications interface 33 is used as an example for description in FIG. 3).

The processor 31 may be a general-purpose central processing unit (central processing unit, CPU), a microprocessor, an application-specific integrated circuit (application-specific integrated circuit, ASIC), or one or more integrated circuits configured to control program execution of the solutions of this application.

The communications line 34 may include a path for transmitting information between the foregoing components.

The communications interface 33 is configured to communicate with another device or a communications network, such as the Ethernet, a radio access network (radio access network, RAN), or a wireless local area network (wireless local area network, WLAN) through any apparatus such as a transceiver.

Optionally, the communications device may further include a memory 32.

The memory 32 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can is accessible by a computer. However, the memory is not limited thereto. The memory may exist independently, and is connected to the processor through the communications line 34. The memory may alternatively be integrated with the processor.

The memory 32 is configured to store computer-execution instructions for executing the solutions in this application, and execution is controlled by the processor 31. The processor 31 is configured to execute the computer-execution instructions stored in the memory 32 to implement a radio resource allocation policy configuration method provided in the following embodiments of this application.

Optionally, the computer-executable instructions in this embodiment of this application may also be referred to as application program code. This is not specifically limited in this embodiment of this application.

In a specific implementation, in an embodiment, the processor 31 may include one or more CPUs, for example, a CPU 0 and a CPU 1 in FIG. 3.

In a specific implementation, in an embodiment, the communications device may include a plurality of processors, for example, the processor 31 and a processor 35 in FIG. 3. Each of the processors may be a single-core (single-CPU) processor or a multi-core (multi-CPU) processor. The processor herein may refer to one or more devices, circuits, and/or processing cores configured to process data (for example, computer program instructions).

In the embodiments of this application, a specific structure of an execution body of a radio resource allocation policy configuration method is not specially limited in the embodiments of this application, provided that a program that records code of the radio resource allocation policy configuration method in the embodiments of this application can be run to perform communication based on the radio resource allocation policy configuration method provided in the embodiments of this application. For example, the execution body of the radio resource allocation policy configuration method provided in the embodiments of this application may be the first network management unit 10, or may be a communications apparatus such as a chip applied to the first network management unit 10. This is not limited in this application. Alternatively, the execution body of the radio resource allocation policy configuration method provided in the embodiments of this application may be the second network management unit 20, or may be a communications apparatus such as a chip applied to the second network management unit 20. This is not limited in this application. Alternatively, the execution body of the radio resource allocation policy configuration method provided in the embodiments of this application may be the service operation system 30, or may be a communications apparatus such as a chip applied to the service operation system 30. This is not limited in this application. The following embodiments are described by using an example in which the execution body of the radio resource allocation policy configuration method is separately the first network management unit 10, the second network management unit 20, and the service operation system 30.

It should be noted that reference may be made to each other for the embodiments of this application. For example, for same or similar steps, mutual reference may be made between the method embodiment and the apparatus embodiment. This is not limited.

Figure 4:
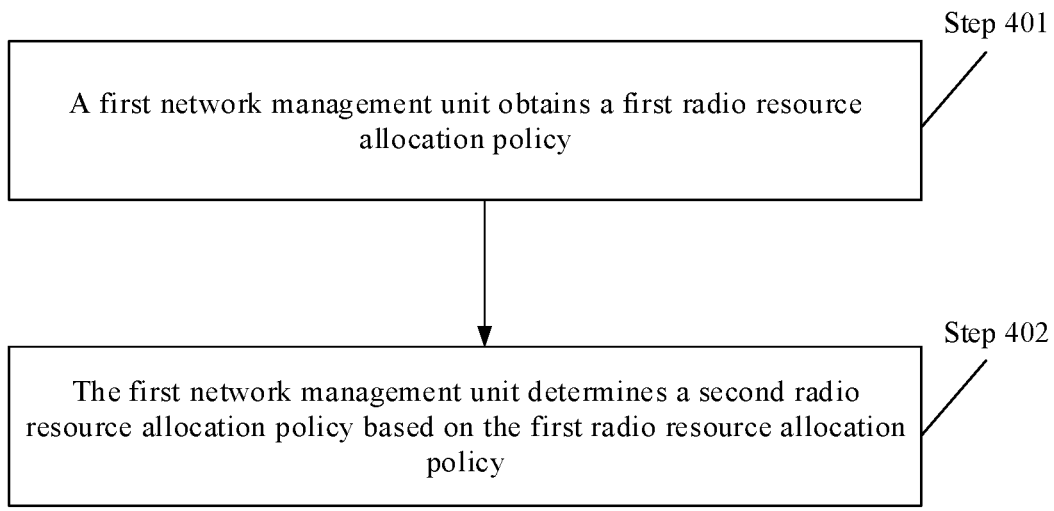
FIG. 4 is a schematic flowchart of a radio resource allocation policy configuration method according to an embodiment of this application.

With reference to FIG. 2, as shown in FIG. 4, an embodiment of this application provides a radio resource allocation policy configuration method. The method includes the following steps.

Step 401: The first network management unit 10 determines a first radio resource allocation policy. The first radio resource allocation policy is used to describe a first proportion of a radio resource, available to each of one or more objects in a first subnetwork, to a first radio resource of the first subnetwork, or the first radio resource allocation policy is used to describe a quantity of the radio resource available to each of the one or more objects in the first subnetwork.

In this embodiment of this application, the one or more objects are one or more of objects supported by the first subnetwork. In one aspect, the one or more objects are all of the objects supported by the first subnetwork. For example, the first subnetwork supports an object 1, an object 2, and an object 3. The one or more objects may include the object 1 to the object 3. Alternatively, in another aspect, the one or more objects are some of the objects supported by the first subnetwork. For example, the one or more objects include the object 2 and the object 3.

For example, the first radio resource includes any one or more of a physical resource block (physical resource block, PRB) resource, a quantity of terminals that are allowed to access the first radio resource, a packet data convergence protocol (packet data convergence protocol, PDCP) resource, a quantity of radio resource control (radio resource control, RRC) connections that are allowed to be established in the first radio resource, a slot resource, a quantity of cells that share the first radio resource, and a frequency resource.

For example, the first radio resource allocation policy includes an identifier of each of the one or more objects and a first proportion associated with the identifier of each object.

In a possible example, the first proportion may be a specific value, that is, the first proportion of any object is used to indicate a specific proportion of a radio resource, available to the object, to the first radio resource. For example, as shown in Table 1, a first proportion corresponding to a network slice #1 is 40%.

In another possible example, the first proportion may be a proportion range, that is, the first proportion of any object is used to indicate a range that is of a radio resource allowed to be used by the object and that is in the first radio resource. The first network management unit 10 may determine a radio resource use proportion value in the proportion range based on a specific scenario. For example, the first proportion ranges from 40% to 60%.

In still another possible example, the first proportion may be a radio resource assurance proportion range, and is used to describe an allowable value of an assurance proportion of a radio resource available to an object. The first network management unit 10 may determine a radio resource assurance proportion of any object in a radio resource assurance proportion range of the object based on a specific scenario.

For example, the first radio resource allocation policy includes an identifier of each of the one or more objects and a quantity of radio resources associated with the identifier of each object. It should be noted that the quantity of radio resources may be a specific value, a quantity range, or a radio resource assurance quantity range.

A second proportion in this embodiment of this application may also be a specific value, a range value, or a radio resource assurance proportion range.

It should be understood that the first network management unit 10 may manage one or more subnetworks, and the first subnetwork is any of the one or more subnetworks.

Step 402: The first network management unit 10 determines a second radio resource allocation policy based on the first radio resource allocation policy. The second radio resource allocation policy is used to describe a second proportion of a radio resource, available to each of one or more objects in a first cell, to a second radio resource of the first cell, or the second radio resource allocation policy is used to describe a quantity of the radio resources available to each of the objects in the first cell. The objects in the first cell include at least one object of the one or more objects, and the first cell is a cell of the first subnetwork.

That the objects in the first cell include at least one object of the one or more objects may be understood as that there is an intersection set of the objects in the first cell and the one or more objects, or may be understood as that the objects in the first cell and the one or more objects have at least one same object. For example, an object 1 is an object belonging to the first cell, and the object 1 is also an object in the one or more objects.

It should be understood that the sum of second proportions of all of the objects in the first cell is equal to 1. The sum of available radio resources allocated to all of the objects in the first cell based on the second proportions is less than or equal to a size of the second radio resource. The sum of the first proportion of the one or more objects is less than or equal to 1. The sum of available radio resources allocated to the one or more objects based on the first proportion is less than or equal to a size of the first radio resource.

In a possible implementation, the object in this embodiment of this application may be any one or a combination of a plurality of subnetwork requirement information (SubnetProfile), a network slice, a service, a tenant, and a public land mobile network (Public land mobile network, PLMN).

(Example 1): The object is any one of a SubnetProfile, a network slice, a service, a tenant, and a PLMN.

Figure 5:
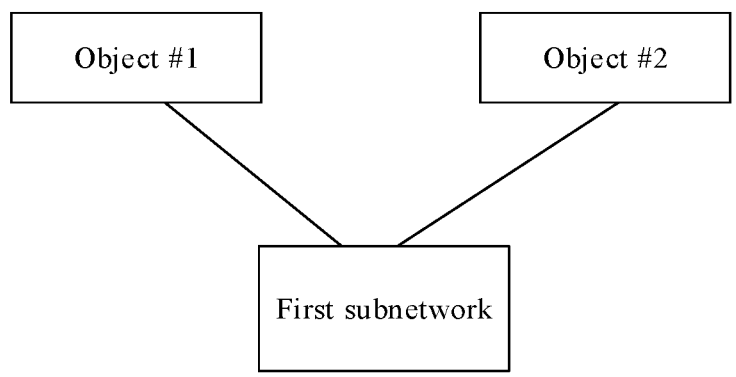
FIG. 5 to FIG. 7 are schematic diagrams of a relationship between a cell and an object according to an embodiment of this application.

For example, the object is a SubnetProfile. A SubnetProfile is used to describe a group of requirement information of a subnetwork, and a first subnetwork may support one or more SubnetProfiles. In this case, the first radio resource allocation policy is used to describe a proportion of a radio resource, available to each of the one or more SubnetProfiles of the first subnetwork, to the first radio resource of the first subnetwork. As shown in FIG. 5, an example in which the first subnetwork supports an object 1 and an object 2 is used in FIG. 5. In this case, the object 1 may be a SubetProfile #1, and the object 2 may be a SubetProfile #2. First proportions respectively corresponding to the SubetProfile #1 and the SubnetProfile #2 may be shown in Table 1.

TABLE 1

| Identifier of a subnetwork | Identifier of a SubnetProfile | First proportion in the first radio resource |
| --- | --- | --- |
| First subnetwork | SubnetProfile #1 | 40% |
|  | SubnetProfile #2 | 60% |

Figure 6:
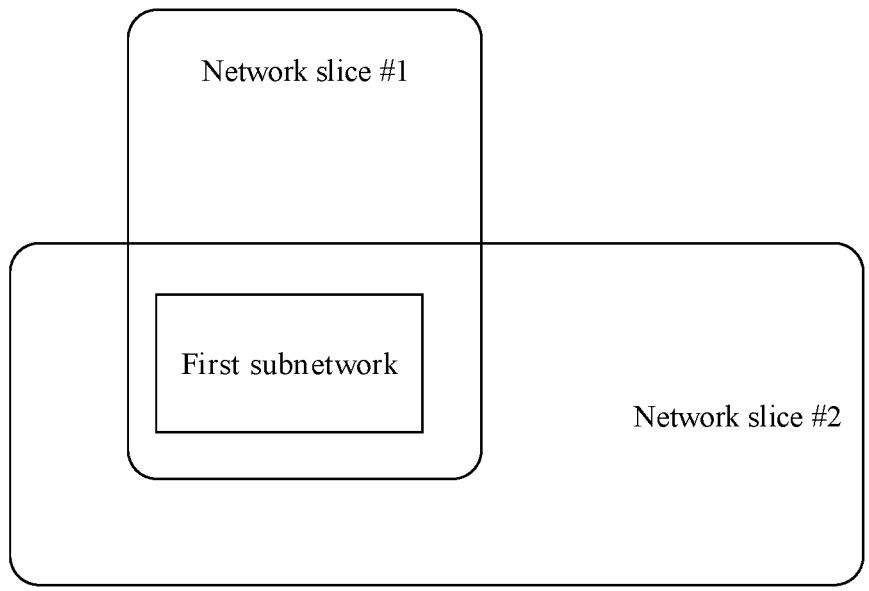

For example, the object is a network slice. A subnetwork may be shared by a plurality of network slices. In this case, the first radio resource allocation policy is used to describe a first proportion of a radio resource, available to each of one or more network slices of the first subnetwork, to the first radio resource. As shown in FIG. 6, FIG. 6 uses an example in which the first subnetwork is shared by a network slice #1 and a network slice #2. First proportions respectively corresponding to the network slice #1 and the network slice #2 may be shown in Table 2.

TABLE 2

| Identifier of a subnetwork | Identifier of a network slice | First proportion in the first radio resource |
| --- | --- | --- |
| First subnetwork | Network slice #1 | 40% |
|  | Network slice #2 | 60% |

For example, the identifier of the network slice may be a network slice instance identifier (network slice instance ID, NSI ID), single network slice selection assistance information (single network slice selection assistance information, S-NSSAI), or an identifier of a network slice managed object instance (Distinguished name of Network Slice Managed Object Instance).

For example, the object is a service. The first subnetwork may provide one or more services. In this case, the first radio resource allocation policy is used to describe a first proportion of a radio resource, available to each of the one or more services of the first subnetwork, to the first radio resource. As shown in FIG. 5, in this case, the object 1 in FIG. 5 may be a service #1, and the object 2 may be a service #2. First proportions respectively corresponding to the service #1 and the service #2 may be shown in Table 3.

TABLE 3

| Identifier of a subnetwork | Identifier of a service | First proportion in the first radio resource |
|---|---|---|
| First subnetwork | Service #1 | 40% |
|  | Service #2 | 60% |

For example, the identifier of the service identifier may be any one or more of network slice selection assistance information (NSSAI) or S-NSSAI, a network slice type (Service/Slice Type, SST), a communication service instance identifier (Communication Service Instance Id), a communication service type (Communication Service Type), and a service requirement information identifier (ServiceProfileld). A service requirement information identifier of a subnetwork is used to describe a group of service requirement information carried by the subnetwork. A service requirement information identifier of a network is used to describe a group of service requirement information carried by the network.

For example, the object is a tenant. A first subnetwork may be used by a plurality of tenants. To be specific, in this case, the first radio resource allocation policy is used to describe a first proportion of a radio resource, available to each of one or more tenants of the first subnetwork, to the first radio resource. As shown in FIG. 5, in this case, the object 1 in FIG. 5 may be a tenant #1, and the object 2 may be a tenant #2. First proportions respectively corresponding to the tenant #1 and the tenant #2 may be shown in Table 4.

TABLE 4

| Identifier of a subnetwork | Identifier of a tenant | First proportion in the first radio resource |
|---|---|---|
| First subnetwork | Tenant #1 | 40% |
|  | Tenant #2 | 60% |

For example, the object is a PLMN. The first subnetwork may provide a service for a plurality of PLMNs. To be specific, in this case, the first radio resource allocation policy is used to describe a first proportion of a radio resource, available to each of one or more PLMNs of the first subnetwork, to the first radio resource. As shown in FIG. 5, in this case, the object 1 in FIG. 5 may be a PLMN #1, and the object 2 may be a PLMN #2. First proportions respectively corresponding to the PLMN #1 and the PLMN #2 may be shown in Table 5.

TABLE 5

| Identifier of a subnetwork | Identifier of a PLMN | First proportion in the first radio resource |
|---|---|---|
| First subnetwork | PLMN #1 | 40% |
|  | PLMN #2 | 60% |

(Example 2): The object is a combination of any two or more of a SubnetProfile, a network slice, a service, a tenant, and a PLMN.

Possible combination manner 1: The combination is a multi-dimensional combination. In this case, a first object set includes one or more combinations. The combination includes any two or more elements in the SubnetProfile, the network slice, the service, the tenant, and the PLMN.

For example, the combination is a combination of the PLMN and the network slice. In this case, the first radio resource policy is used to describe a first proportion of each [PLMN, network slice] combination in one or more different [PLMN, network slice] combinations, that is, a first proportion of a radio resource, available to each [PLMN, network slice] combination in the one or more different [PLMN, network slice] combinations supported by the first subnetwork, to the first radio resource.

For example, the object is a [PLMN, network slice] combination. In this case, the one or more objects include one or more [PLMN, network slice] combinations. As shown in Table 6, a first proportion corresponding to a [PLMN #1, network slice #1] combination is 20%, and a first proportion corresponding to a [PLMN#2, network slice #1] combination is 30%.

TABLE 6

| Identifier of a subnetwork | Identifier of a PLMN | Identifier of a network slice | First proportion in the first radio resource |
|---|---|---|---|
| First subnetwork | PLMN #1 | Network slice #1 | 20% |
|  | PLMN #1 | Network slice #2 | 20% |
|  | PLMN #2 | Network slice #1 | 30% |
|  | PLMN #2 | Network slice #2 | 30% |

Other combination manners are not enumerated one by one, and a 5-tuple (tenant, PLMN, network slice, SubnetProfile, service) is supported at most.

Figure 7:
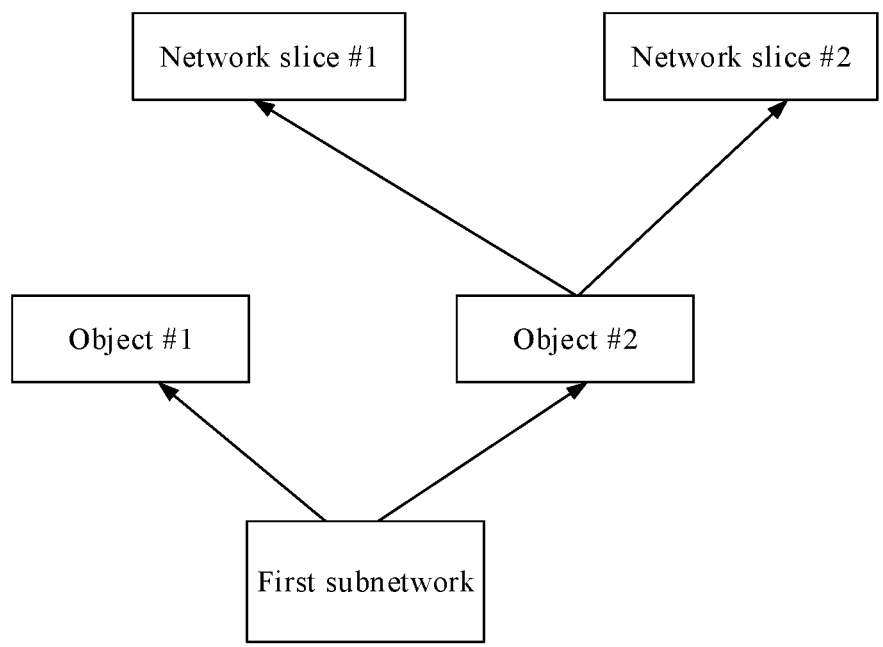

Possible combination manner 2: The combination is a nested combination. For example, a subnetwork supports a plurality of SubnetProfiles (parent object), and each SubnetProfile describes requirement information of a plurality of network slices (child object). As shown in FIG. 7, the first subnetwork supports a SubnetProfile #1 and a SubnetProfile #2, and the SubnetProfile #2 corresponds to a network slice #1 and a network slice #2. In this case, the first radio resource allocation policy is shown in the following Table 7.

TABLE 7

| Identifier of a subnetwork | Identifier of a SubnetProfile | First proportion in the first radio resource | Identifier of a network slice | Proportion in a radio resource available to a parent object |
|---|---|---|---|---|
| First subnetwork | SubnetProfile #1 | 40% | Network slice #1 | 40% |
|  |  |  | Network slice #2 | 60% |
|  | SubnetProfile #2 | 60% | Network slice #3 | 40% |
|  |  |  | Network slice #4 | 60% |

It should be noted that in the nested combination, when the combination is the nested combination, the first radio resource allocation policy may describe a proportion of a radio resource, available to each of one or more parent objects, to the first radio resource (for example, a first proportion of the SubnetProfile #1 in the first radio resource is 40%). In addition, the first radio resource allocation policy may further describe a proportion of one or more child objects in a radio resource available to a parent object to which the one or more child objects belong.

For example, if a size of the first radio resource is Y, a radio resource available to the SubnetProfile #1 is 0.4 Y, and a radio resource available to the network slice #1 is 0.4×0.4 Y=1.6 Y.

In another possible implementation of this embodiment of this application, in this embodiment of this application, any one of one or more objects or any one of objects supported by the first cell may include one or more sub-objects. In this case, a first proportion of any object is used to describe a proportion of a total radio resource, available to the one or more sub-objects belonging to the object, to the first radio resource. A second proportion of any object is used to describe a proportion of a total radio resource, available to the one or more sub-objects belonging to the object, to the second radio resource.

For example, the object is a network slice group. A network slice group includes one or more network slices. To be specific, the first radio resource allocation policy is used to describe a first proportion of a radio resource, available to each of all network slice groups supported by the first subnetwork, to the first radio resource. All network slices in a same network slice group share a radio resource available to the network slice group. For example, as shown in Table 8, a first proportion corresponding to a network slice group #1 is 40%, and therefore a proportion of a total radio resource, available to a network slice #1 and a network slice #2, to the first radio resource is 40%.

TABLE 8

| Identifier of a subnetwork | Identifier of a network slice group | First proportion in the first radio resource |
| --- | --- | --- |
| First subnetwork | Network slice group #1 (a network slice #1 and a network slice #2) | 40% |
|  | Network slice group #2 (a network slice #3 and a network slice #4) | 60% |

It should be noted that the one or more objects and the objects in the first cell belong to a same dimension. For example, if the object described in the first radio resource allocation policy is a network slice, the object described in the second radio resource allocation policy is also a network slice. If the object described in the first radio resource allocation policy is a network slice group, the object described in the second radio resource allocation policy is also a network slice group. If the object described in the first radio resource allocation policy is a multi-dimensional combination, the object described in the second radio resource allocation policy is also a multi-dimensional combination.

This embodiment of this application provides a radio resource allocation policy configuration method. In this solution, the first radio resource allocation policy of the first subnetwork is introduced. Because the first radio resource allocation policy describes the first proportion of the radio resource, available to each of the one or more objects in the first subnetwork, to the first radio resource, the second proportion of each of the objects in the first cell may be determined based on the one or more objects described in the first radio resource allocation policy. In this way, when the first proportion of any of the one or more objects changes, this helps the first network management unit adjust radio resource allocation policies of different cells based on a real-time scenario, so that dynamicity is better and resource use efficiency is higher. In addition, in this solution, different first radio resources may be set for different subnetworks, which is simpler than a radio resource allocation policy of a cell.

In a possible implementation, the method provided in this embodiment of this application further includes: The first network management unit 10 obtains any one or more of the following information corresponding to the first radio resource allocation policy: time information and a network congestion status. The time information is used to indicate a time period in which the first radio resource allocation policy is applied, and the network congestion status is used to indicate a network status in which the first radio resource allocation policy is applied Specifically, the time information mainly indicates that the first radio resource allocation policy can be used in a specified time period. For example, the specified time period may be 8:00 to 12:00 in the morning, (12:00 to 18: 00) in the noon, or (18:00 to 24:00) in the evening; or may be a holiday. The network congestion status may be a network congestion level, for example, moderate congestion, non-congestion, or the like. In other words, the first radio resource allocation policy may be used when a network is congested.

Figure 8A:
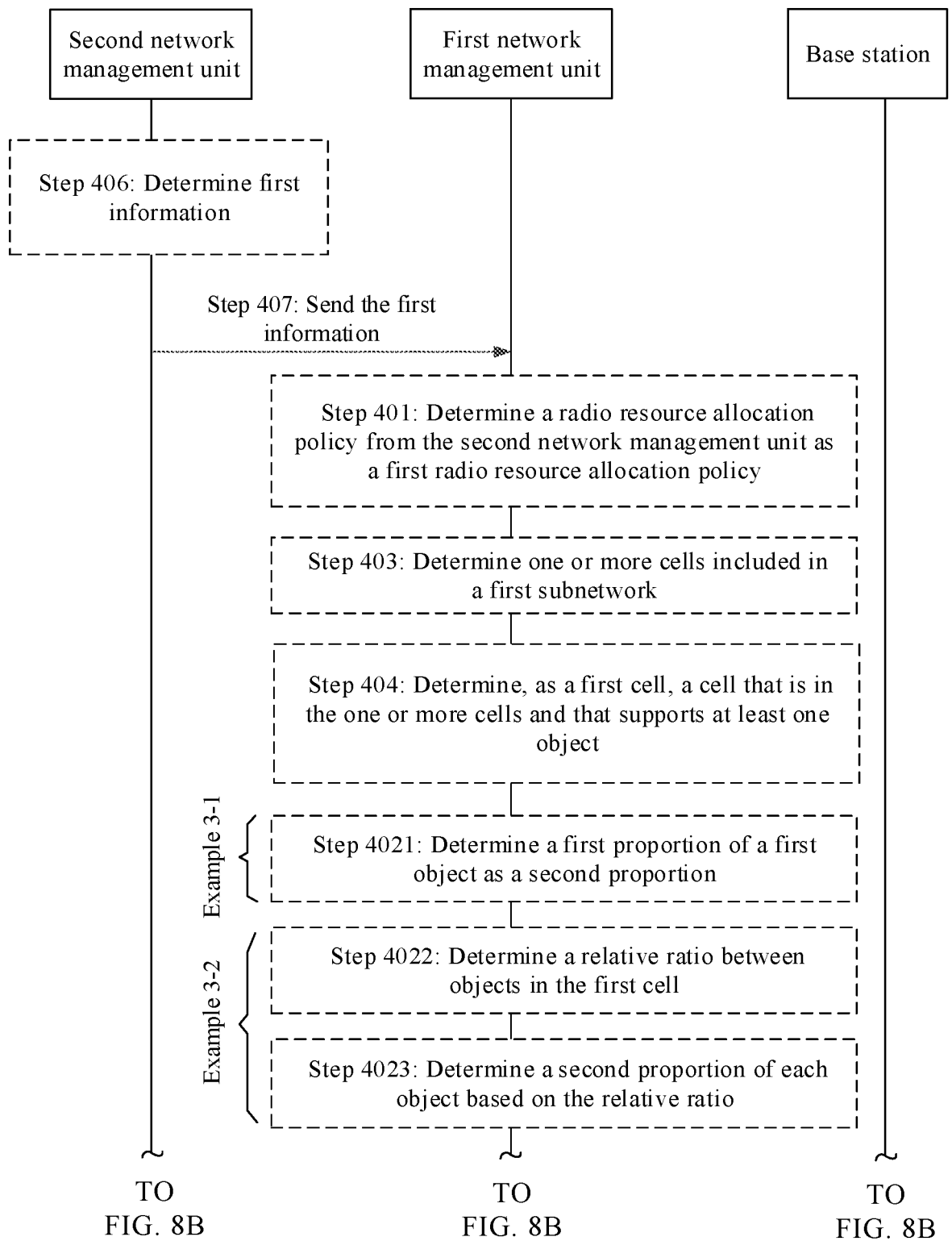
FIG. 8A to FIG. 12B are schematic flowcharts of another radio resource allocation policy configuration method according to an embodiment of this application.

The first subnetwork may include one or more cells, and the object described in the first radio resource allocation policy may not be an object supported by a specific cell. Therefore, in a possible embodiment, as shown in FIG. 8A, before step 402, the method provided in this embodiment of this application may further include the following steps.

Step 403: The first network management unit 10 determines one or more cells included in the first subnetwork.

For example, the first network management unit 10 has at least a mapping relationship table. The mapping relationship table includes a mapping relationship between an identifier of the first subnetwork and the one or more cells. In this way, once determining the identifier of the first subnetwork, the first network management unit can determine, with reference to the mapping relationship table, the one or more cells included in the first subnetwork.

Step 404: The first network management unit 10 determines, as the first cell, a cell that is in the one or more cells and that supports at least one object of the one or more objects.

In this embodiment of this application, the at least one object of the one or more objects may be all of the one or more objects, or may be some of the one or more objects. This is not limited in this embodiment of this application.

In possible implementation, step 404 in this embodiment of this application may be implemented in the following manner: The first network management unit 10 determines whether the one or more objects described in the first radio resource allocation policy is an object supported by a cell. If a cell supports all or some of the one or more objects, the cell is a cell (that is, the first cell) related to the first radio resource allocation policy of the first subnetwork.

In this embodiment of this application, that the objects in the first cell include the at least one object of the one or more objects may have the following meanings: 1. The objects in the first cell are the same as the one or more objects, that is, all of the objects in the first cell are the same as all of the one or more objects. 2. The at least one object is all of the objects in the first cell. In other words, some of the one or more objects are all of the objects in the first cell. 3. In addition to the at least one object, the objects in the first cell may further include at least one second object in an object in the second subnetwork.

Because specific implementations of step 402 are different in different cases, the specific implementations of step 402 in different cases are separately described below.

Example 3-1: The objects in the first cell are the same as the one or more objects.

As shown in FIG. 8A, in a possible implementation, step 402 provided in this embodiment of this application may be implemented in the following manner.

Step 4021: The first network management unit 10 determines a first proportion of a first object in the one or more objects as a second proportion of the first object in the second radio resource. In other words, the second proportion that is of the first object in the objects in the first cell and that is in the second radio resource is the same as the first proportion of the first object in the first radio resource, and the first object is any of the objects in the first cell.

It should be understood that when all the objects in the first cell are completely the same as all objects described in the first radio resource allocation policy, the first network management unit 10 may determine the second radio resource allocation policy as the first radio resource allocation policy.

For example, the object is a network slice, and the first subnetwork is a subnetwork #1. When a first object set described in the first radio resource allocation policy includes a network slice #1 and a network slice #2, Table 9 shows a first proportion of the network slice #1 and a first proportion of the network slice #2.

TABLE 9

First radio resource allocation policy

| Identifier of the first subnetwork | Identifier of a network slice | First proportion in the first radio resource |
|---|---|---|
| Subnetwork #1 | Network slice #1 | 40% |
| | Network slice #2 | 60% |

If the first cell supports the network slice #1 and the network slice #2, a second proportion of the network slice #1 and a second proportion of the network slice #2 are shown in Table 10.

TABLE 10

Second radio resource allocation policy

| Identifier of a cell | Identifier of a network slice | Second proportion in the second radio resource |
|---|---|---|
| First cell | Network slice #1 | 40% |
| | Network slice #2 | 60% |

Example 3-2: The at least one object is all the objects in the first cell. In other words, the one or more objects include all of the objects in the first cell, and an object that do not belong to the first cell.

As shown in FIG. 8A, in another possible implementation, step 402 provided in this embodiment of this application may be implemented in the following manner.

Step 4022: The first network management unit 10 determines a relative ratio between the objects in the first cell based on a first proportion of each of the at least one object.

In a possible implementation, step 4022 in this embodiment of this application may be implemented in the following manner: The first network management unit 10 determines, from the one or more objects, at least one object included in both the one or more objects and the first cell. The first network management unit 10 determines a relative ratio between the at least one object based on a first proportion of the at least one object.

For example, the object is a network slice, and the first subnetwork is a subnetwork #1. When the one or more objects described in the first radio resource allocation policy include a network slice #1, a network slice #2, and a network slice #3, as shown in Table 11, a first proportion of the network slice #1 is 40%, a first proportion of the network slice #2 is 30%, and a first proportion of the network slice #3 is 30%. The first network management unit 10 determines that a relative ratio between the network slice #1, the network slice #2, and the network slice #3 is 4:3:3.

TABLE 11

First radio resource allocation policy

| Identifier of a subnetwork | Identifier of a network slice | Second proportion in the first radio resource |
|---|---|---|
| Subnetwork # 1 | Network slice #1 | 40% |
| | Network slice #2 | 30% |
| | Network slice #3 | 30% |

Step 4023: The first network management unit 10 determines a second proportion of each of the objects in the first cell based on the relative ratio between the objects in the first cell.

For example, the first cell is a cell #1. If the cell #1 supports the network slice #2 and the network slice #3, it may be determined from Table 11 that a relative ratio between radio resources used by the network slice 2 and the network slice 3 in the subnetwork #1 is 1:1. Therefore, a relative ratio between radio resources used by the network slice 2 and the network slice 3 in the cell #1 is also 1:1, so that a second proportion of the network slice 2 and a second proportion of the network slice 3 are shown in Table 12.

TABLE 12

Second radio resource allocation policy

| Identifier of a cell | Identifier of a network slice | Second proportion in the second radio resource |
|---|---|---|
| Cell #1 | Network slice #2 | 50% |
| | Network slice #3 | 50% |

It should be noted that if a second object set includes only one object, a second proportion of the object is 100%.

Example 3-3: In addition to including at least one object of the one or more objects, the objects in the first cell may further include at least one second object in the object in the second subnetwork. To be specific, all the objects in the first cell include all or some of the one or more objects and all or some objects in the second subnetwork. The at least one second object may be all or some of the objects in the second subnetwork.

Figure 8B:
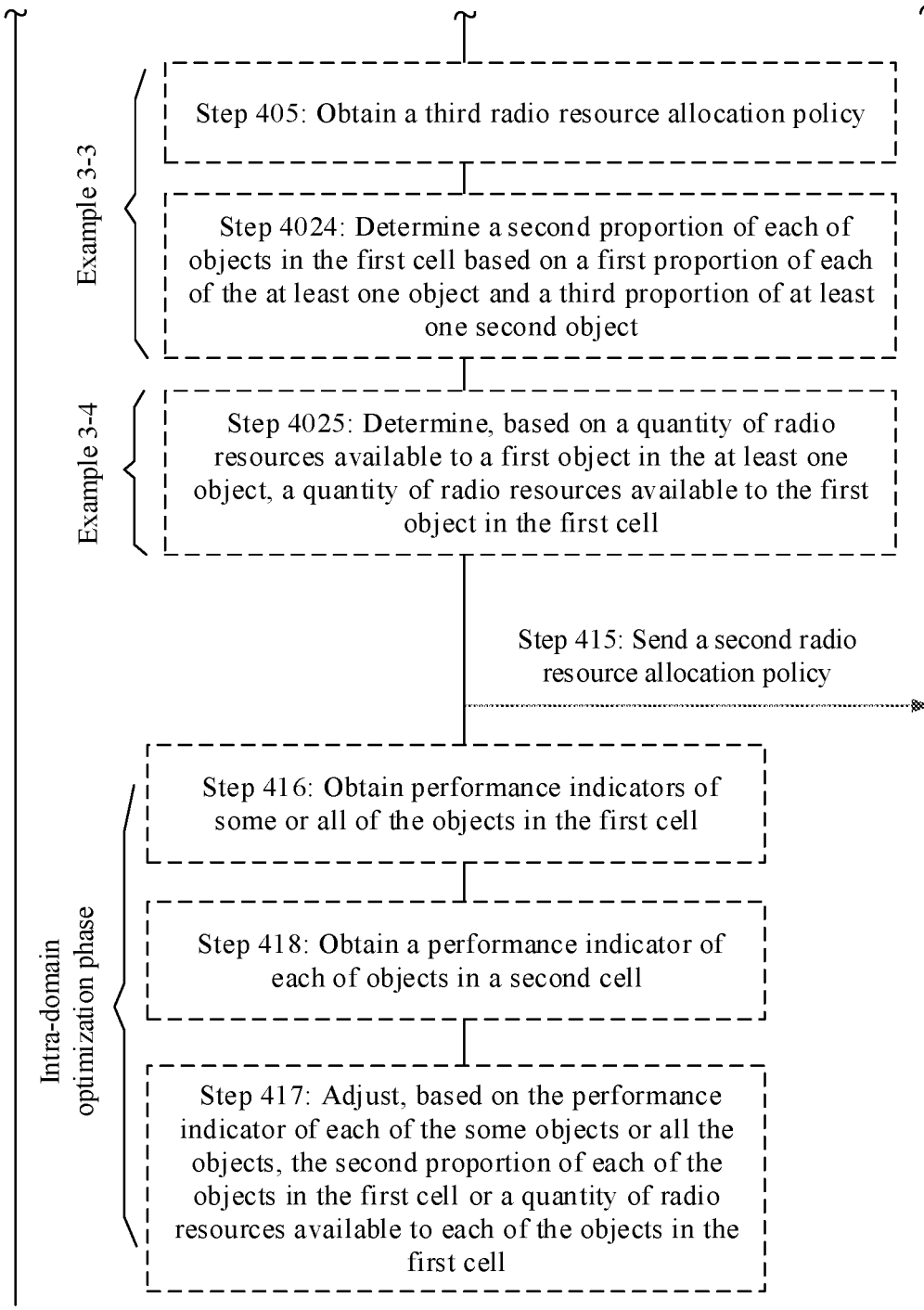

In a possible embodiment, as shown in FIG. 8B, before step 402, the method provided in this embodiment of this application further includes the following step.

Step 405: The first network management unit 10 obtains a third radio resource allocation policy. The third radio resource allocation policy is used to describe a third proportion that is of the object in the second subnetwork and that is in a third radio resource of the second subnetwork.

Correspondingly, with reference to step 405, in still another possible implementation, step 402 in this embodiment of this application may be specifically implemented in the following manner.

Step 4024: The first network management unit 10 determines a second proportion of each of the objects in the first cell based on a first proportion of each of the at least one object and the third proportion of the at least one second object.

In a possible implementation, step 4024 provided in this embodiment of this application may be implemented in the following manner: The first network management unit 10 determines, based on a proportion of the first subnetwork in the second radio resource, a resource that can be allocated to the first subnetwork in the second radio resource; and determines, based on a proportion of the second subnetwork in the second radio resource, a resource that can be allocated to the second subnetwork in the second radio resource. The first network management unit 10 determines a second proportion of each of the at least one object based on the first proportion of each of the at least one object and the resource that can be allocated to the first subnetwork in the second radio resource. The first network management unit 10 determines a second proportion of the at least one second object based on the third proportion of the at least one second object and the resource that can be allocated to the second subnetwork in the second radio resource, to obtain the second proportion of each of the objects in the first cell.

TABLE 13

First radio resource allocation policy and third radio resource allocation policy

| Identifier of a subnetwork | Identifier of a network slice | Proportion of an available radio resource |
|---|---|---|
| Subnetwork #1 | Network slice #1 | 40% |
|  | Network slice #2 | 30% |
|  | Network slice #3 | 30% |
| Subnetwork #2 | Network slice #4 | 50% |
|  | Network slice #5 | 50% |

For example, an object supported by the first cell include the network slice #1 and the network slice #2 in the subnetwork #1, and the network slice #4 and a network slice #5 in the subnetwork #2. If a weight of the subnetwork #1 in the second radio resource is 0.6, a resource that can be allocated to the subnetwork #1 in the second radio resource of the first cell is 0.6 Y. If a weight of the subnetwork #2 in the second radio resource is 0.4, a resource that can be allocated to the subnetwork #2 in the second radio resource of the first cell is 0.4 Y. It can be learned from Table 13 that a relative ratio between the network slice #1 and the network slice #2 is 4:3, and a size of a radio resource available to the network slice #1 in the second radio resource is (4/7)×0.6 Y. A size of a radio resource available to the network slice #2 in the second radio resource is (3/7)×0.6 Y. A relative ratio between the network slice #4 and the network slice #5 is 1:1, and a size of a radio resource available to the network slice #4 in the second radio resource is (1/2)×0.4 Y. A size of a radio resource available to the network slice #5 in the second radio resource is (1/2)×0.4 Y. In this case, second proportions respectively corresponding to the network slice #1, the network slice #2, the network slice #4, and the network slice #5 are shown in Table 14.

TABLE 14

| Identifier of a cell | Identifier of a network slice | Second proportion of an available radio resource |
|---|---|---|
| First cell | Network slice #1 | 34.28% |
|  | Network slice #2 | 25.72% |
|  | Network slice #4 | 20% |
|  | Network slice #5 | 20% |

Example 3-4: As shown in FIG. 8B, in another possible implementation, step 402 provided in this embodiment of this application may be implemented in the following manner.

Step 4025: The first network management unit 10 determines, based on a quantity of radio resources available to a first object in the at least one object, a quantity of radio resources available to a first object in the first cell.

In a possible implementation, the first network management unit 10 determines the quantity of radio resources available to the first object in the at least one object as the quantity of radio resources available to the first object in the first cell. In other words, a quantity of radio resources in the second radio resource that are available to the first object in the objects in the first cell is the same as a quantity of radio resources in the first radio resource that are available to the first object, and the first object is any of the objects in the first cell.

It should be understood that when all the objects in the first cell are completely the same as all objects described in the first radio resource allocation policy, the first network management unit 10 may determine the second radio resource allocation policy as the first radio resource allocation policy.

For example, the object is a network slice, and the first subnetwork is a subnetwork #1. When a first object set described in the first radio resource allocation policy includes a network slice #1 and a network slice #2, Table 15 shows quantities of radio resources available to the network slice #1 and the network slice #2.

TABLE 15

First radio resource allocation policy

| Identifier of the first subnetwork | Identifier of a network slice | A quantity of available radio resources |
|---|---|---|
| Subnetwork # 1 | Network slice #1 | 40 |
|  | Network slice #2 | 60 |

If the first cell supports the network slice #1 and the network slice #2, quantities of radio resources available to the network slice #1 and the network slice #2 are shown in Table 16.

TABLE 16

Second radio resource allocation policy

| Identifier of a cell | Identifier of a network slice | A quantity of available radio resources |
|---|---|---|
| First cell | Network slice #1 | 40 |
|  | Network slice #2 | 60 |

In another possible implementation, the first network management unit 10 determines the quantity of radio resources available to the first object in the at least one object as a total quantity of radio resources available to all first objects in the first cell of the first subnetwork.

For example, Table 15 is used as an example of the first radio resource allocation policy. If the first subnetwork includes four first cells, and each first cell supports a network slice #1 and a network slice #2, quantities of radio resources available to the network slice #1 and the network slice #2 in each first cell are shown in Table 17.

TABLE 17

| | Second radio resource allocation policy | |
|---|---|---|
| Identifier of a cell | Identifier of a network slice | A quantity of available radio resources |
| First cell | Network slice #1 | 10 |
| | Network slice #2 | 15 |
| Second cell | Network slice #1 | 10 |
| | Network slice #2 | 15 |
| Third cell | Network slice #1 | 10 |
| | Network slice #2 | 15 |
| Fourth cell | Network slice #1 | 10 |
| | Network slice #2 | 15 |

It should be noted that quantities of radio resources available to all first objects in the first cells of the first subnetwork may be the same or may be different.

In this embodiment of this application, the first radio resource allocation policy may be obtained by the first network management unit 10 from the second network management unit 20 in an initial configuration phase, or may be obtained by the first network management unit 10 in an optimization phase. Because specific implementations in which the first network management unit 10 obtains the first radio resource allocation policy are different in different phases, the specific implementations are separately described below.

(Example 4-1): The first radio resource allocation policy is obtained from the second network management unit 20.

As shown in FIG. 8A, in a possible embodiment, before step 401, the method provided in this embodiment of this application may further include the following steps.

Step 406: The second network management unit 20 determines first information. The first information is used to determine the first radio resource allocation policy.

For example, in the initial configuration phase, the first information is a radio resource allocation policy of the first subnetwork. In the optimization phase, the first information is an adjusted radio resource allocation policy.

Step 407: The second network management unit 20 sends the first information to the first network management unit 10, so that the first network management unit 10 receives the first information from the second network management unit 20.

Correspondingly, step 401 provided in this embodiment of this application may be specifically implemented in the following manner: The first network management unit 10 determines the first radio resource allocation policy based on the first information.

Figure 9A:
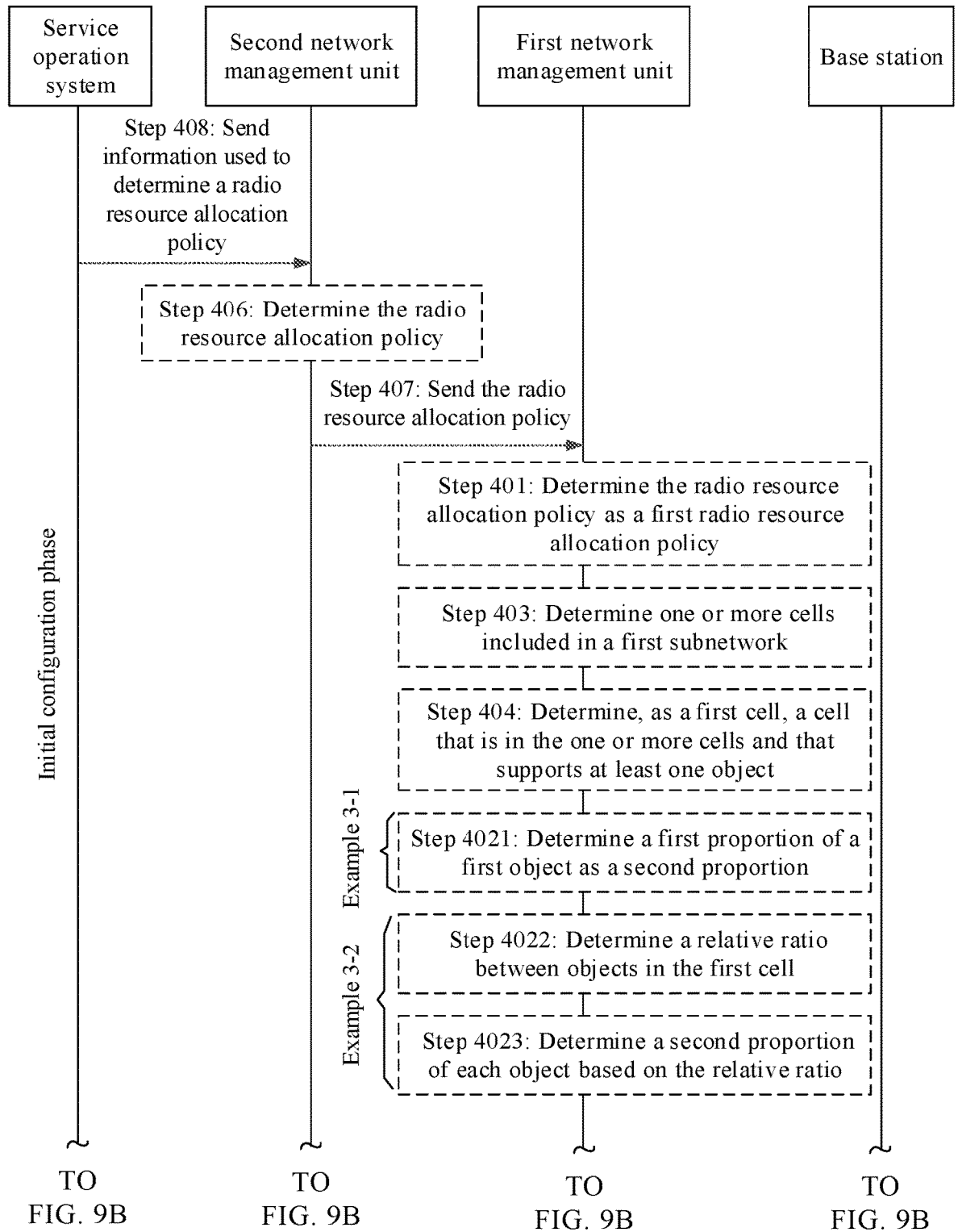

If the first information is a radio resource allocation policy, as shown in FIG. 9A, step 401 in this embodiment of this application may be specifically implemented in the following manner: The first network management unit 10 determines the radio resource allocation policy as the first radio resource allocation policy.

Figure 10A:
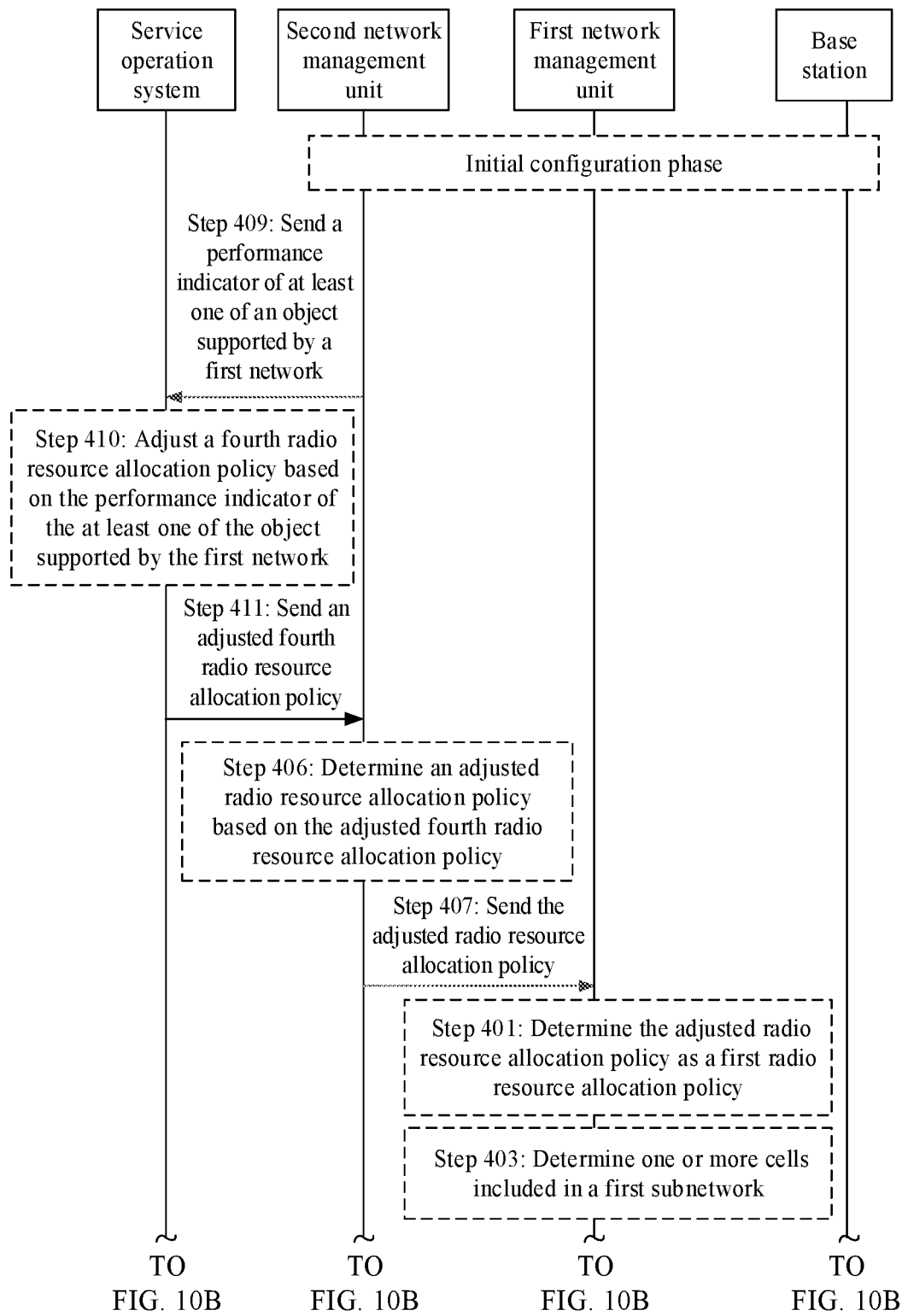
Figure 11A:
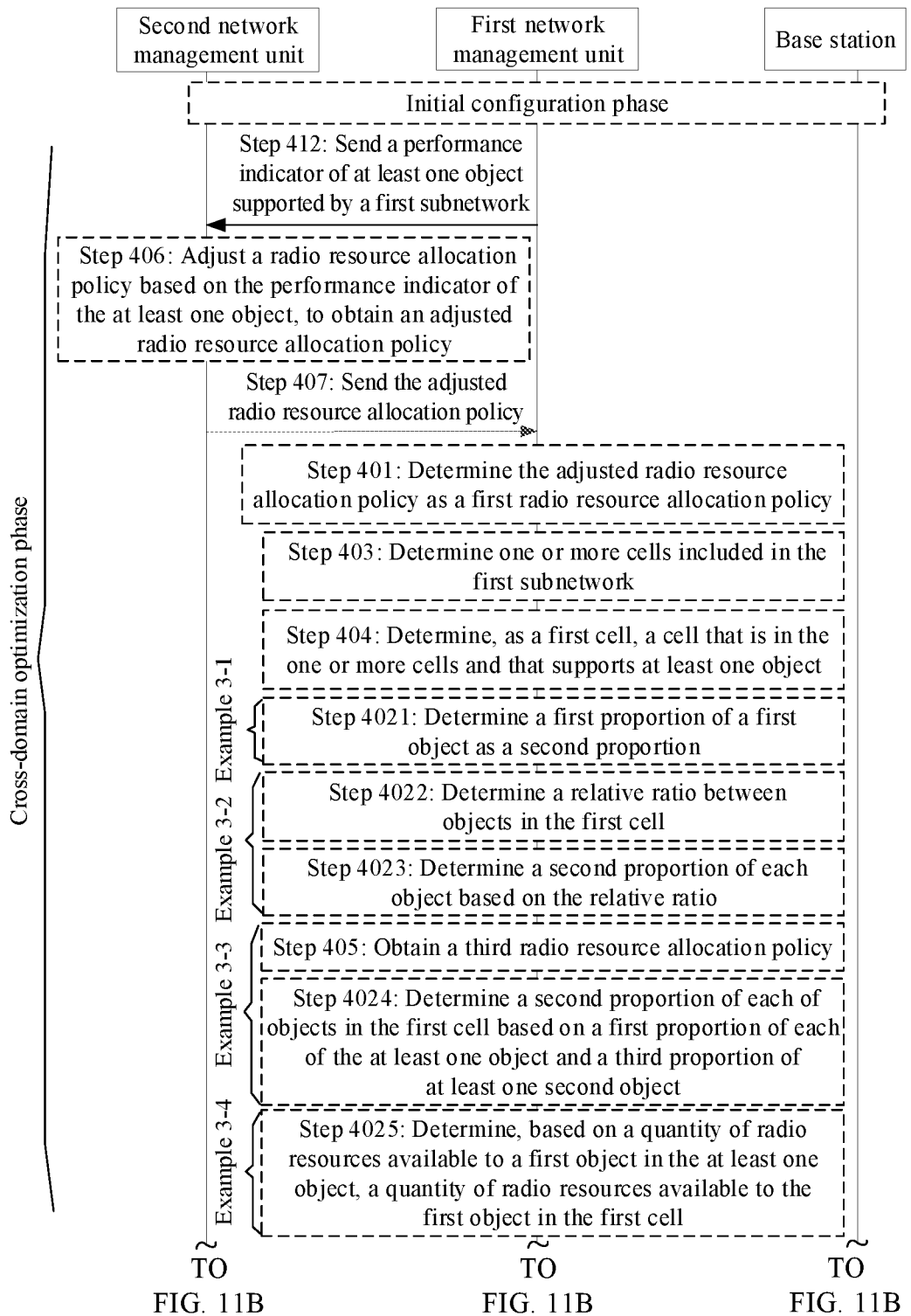
Figure 11B:
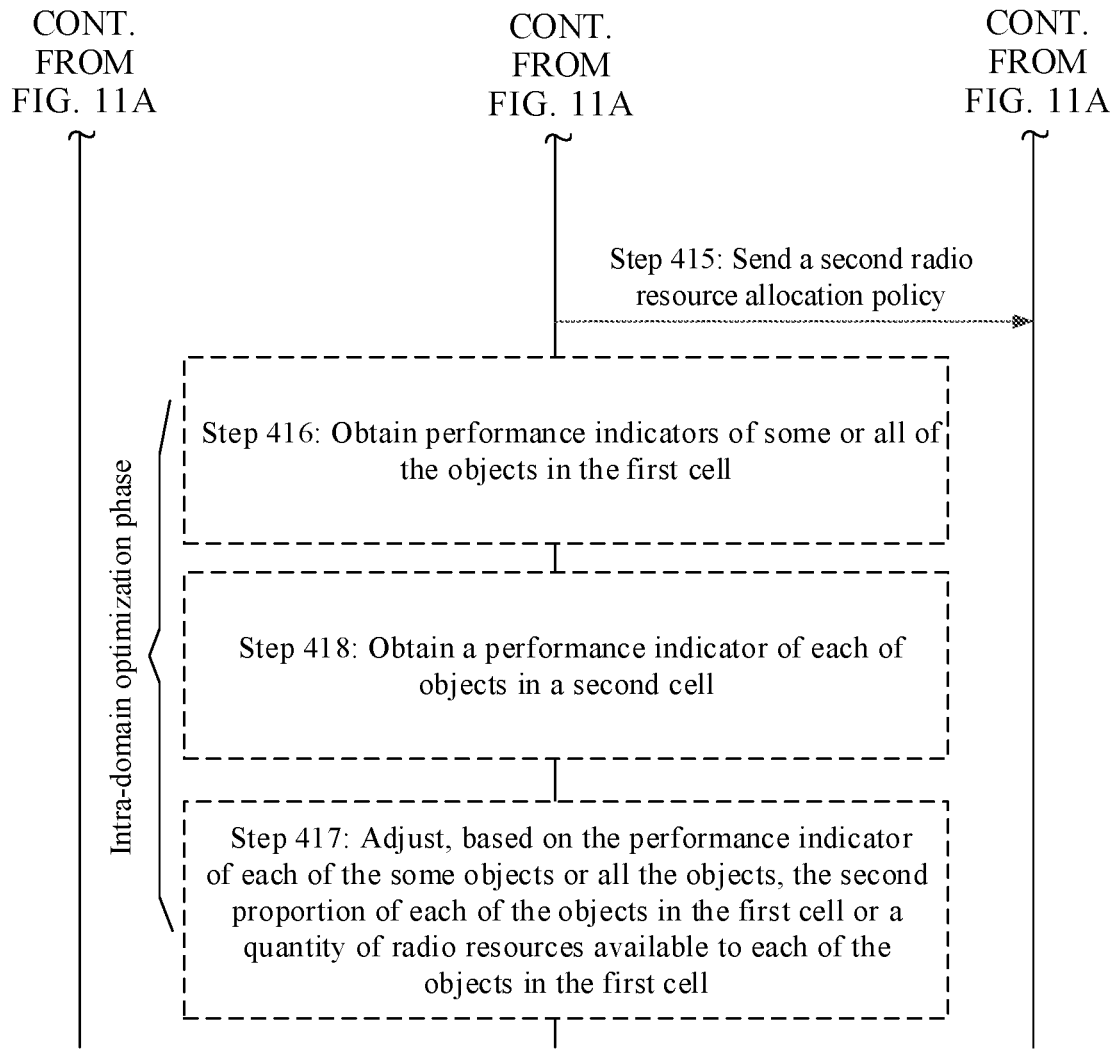

If the first information is the adjusted radio resource allocation policy, as shown in FIG. 10A or FIG. 11A, step 401 in this embodiment of this application may be specifically implemented in the following manner: The first network management unit 10 determines the adjusted radio resource allocation policy as the first radio resource allocation policy.

It should be noted that in this embodiment of this application, if the first network management unit 10 determines the second radio resource allocation policy based on the adjusted radio resource allocation policy, the process may be considered as a phase for optimizing the second proportion of each of the objects in the first cell, or the process is considered as a phase for optimizing the quantity of radio resources available to each of the objects in the first cell.

It should be noted that if the first network management unit 10 has a radio resource allocation policy, steps 406 and 407 may be omitted.

It should be noted that the second network management unit 20 in this embodiment of this application may have information used to determine a radio resource allocation policy. When the second network management unit 20 does not have the information used to determine the radio resource allocation policy, the second network management unit 20 in this embodiment of this application may further obtain, from the service operation system 30, the information used to determine the radio resource allocation policy.

(Example 4-2-1): In the initial configuration phase, the first information is a radio resource allocation policy.

In a possible embodiment, as shown in FIG. 9A, before step 406, the method provided in this embodiment of this application may further include the following step.

Step 408: The service operation system 30 sends, to the second network management unit 20, information used to determine a radio resource allocation policy, so that the second network management unit 20 receives the information used to determine the radio resource allocation policy. For example, the information used to determine the radio resource allocation policy may be a fourth radio resource allocation policy of the first network; or the information used to determine the radio resource allocation policy may be a radio resource allocation policy. The fourth radio resource allocation policy is at least used to determine the radio resource allocation policy. The first network includes the first subnetwork.

In this embodiment of this application, the service operation system 30 may actively send the fourth radio resource allocation policy of the first network to the second network management unit 20. Alternatively, the service operation system 30 may send the fourth radio resource allocation policy to the second network management unit 20 based on a request message from the second network management unit 20.

Correspondingly, as shown in FIG. 9A, step 406 provided in this embodiment of this application may be specifically implemented in the following manner: The second network management unit 20 determines the radio resource allocation policy based on the information used to determine the radio resource allocation policy. Step 407 may be specifically implemented in the following manner: The second network management unit 20 sends the radio resource allocation policy to the first network management unit 10.

For example, an object described in the fourth radio resource allocation policy is a service. An object supported by the first network includes one or more services. The fourth radio resource allocation policy of the first network describes a fourth proportion of a radio resource, available to each of all the services supported by the first network, to a fourth radio resource of the first network, or the fourth radio resource allocation policy describes a quantity of the radio resources available to each of all the services supported by the first network.

In a possible implementation, the fourth radio resource allocation policy of the first network includes a radio resource allocation policy of each of a plurality of subnetworks belonging to the first network. Alternatively, the radio resource allocation policy of the first network includes a fourth proportion of each of all the objects supported by the first network, or includes a quantity of radio resources available to each of all the objects supported by the first network. For example, the fourth radio resource allocation policy of the first network describes the following: a fourth proportion of an object 1 is 40%, a fourth proportion of an object 2 is 10%, and a fourth proportion of an object 3 is 50%. If the first subnetwork includes the object 1 and the object 2, the second network management unit 20 may determine that a first proportion of the object 1 is 80%, and a first proportion of the object 2 is 20%.

For example, the fourth radio resource includes a frequency resource, a quantity of terminals, and the like.

(Example 4-2-2): In a cross-domain optimization phase, the first information is the adjusted radio resource allocation policy, and the service operation system 30 adjusts the fourth radio resource allocation policy of the first network.

In a possible embodiment, as shown in FIG. 10A, before step 406, the method provided in this embodiment of this application may further include the following steps.

Step 409: The second network management unit 20 sends, to the service operation system 30, a performance indicator of at least one of an object supported by the first network, so that the service operation system 30 receives the performance indicator of the at least one of the object supported by the first network.

The performance indicator includes a quantity of terminals allowed to access, a quantity of terminals allowed to be registered in the first network, a throughput, throughput distribution, a delay, a quantity of RRC connections, and the like.

Step 410: The service operation system 30 adjusts the fourth radio resource allocation policy based on the performance indicator of the at least one of the object supported by the first network.

In a possible implementation, step 410 in this embodiment of this application may be specifically implemented in the following manner: The service operation system 30 adjusts the fourth radio resource allocation policy if the service operation system 30 determines, based on the performance indicator of the at least one of the object by the first network, that effective utilization of the fourth radio resource of the first network is less than a preset value. For example, if resource utilization of an object A in the at least one of the object supported by the first network is less than a threshold a, a fourth proportion of the object A is decreased or a quantity of radio resources available to the object A is decreased. If resource utilization of an object B is greater than a threshold b, a fourth proportion of the object B is increased or a quantity of radio resources available to the object B is increased.

Step 411: The service operation system 30 sends an adjusted fourth radio resource allocation policy to the second network management unit 20, so that the second network management unit 20 receives the adjusted fourth radio resource allocation policy.

Correspondingly, step 406 in this embodiment of this application may be specifically implemented in the following manner: The second network management unit 20 determines the adjusted radio resource allocation policy based on the adjusted fourth radio resource allocation policy.

Figure 9B:
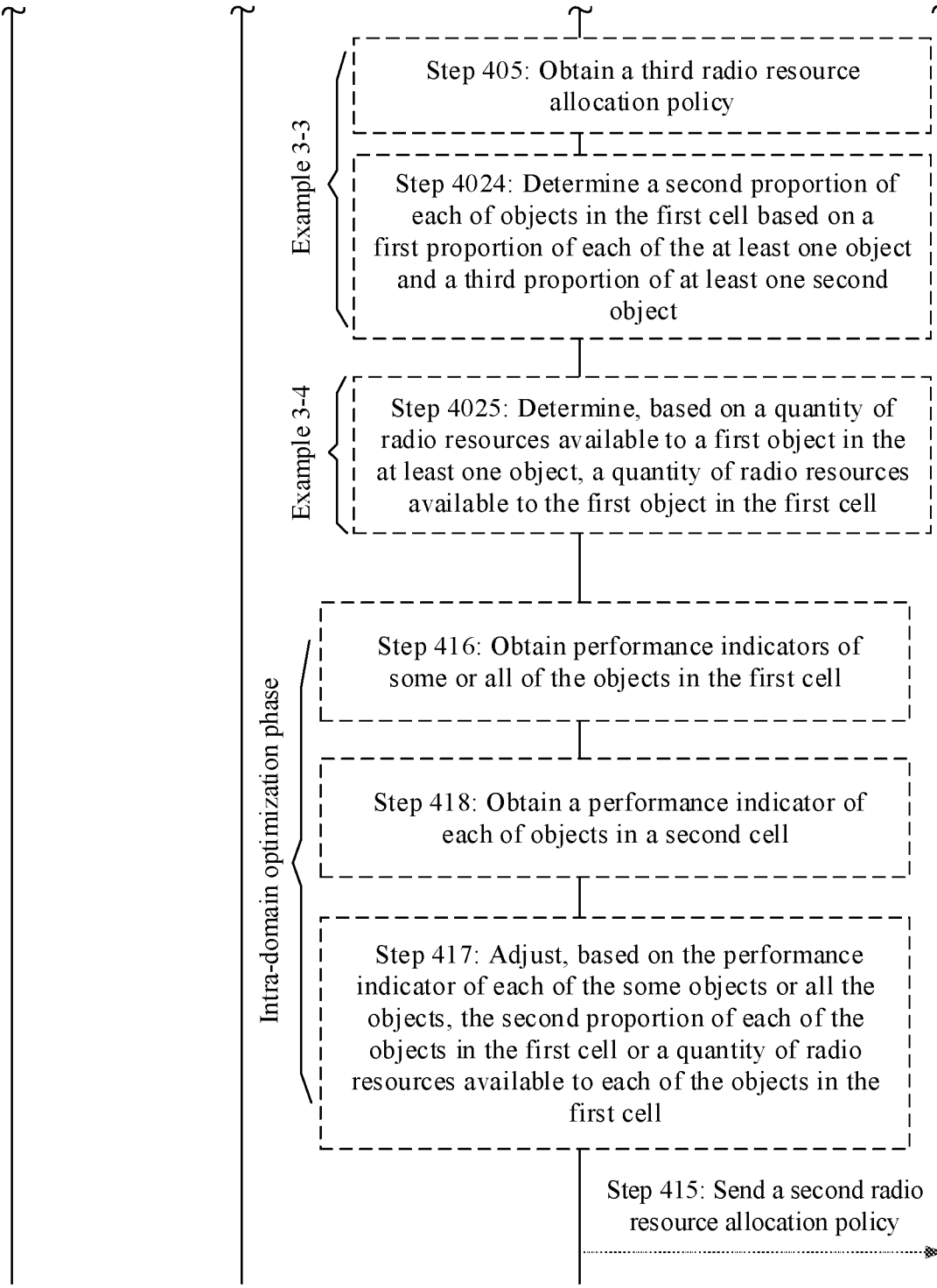
Figure 10B:
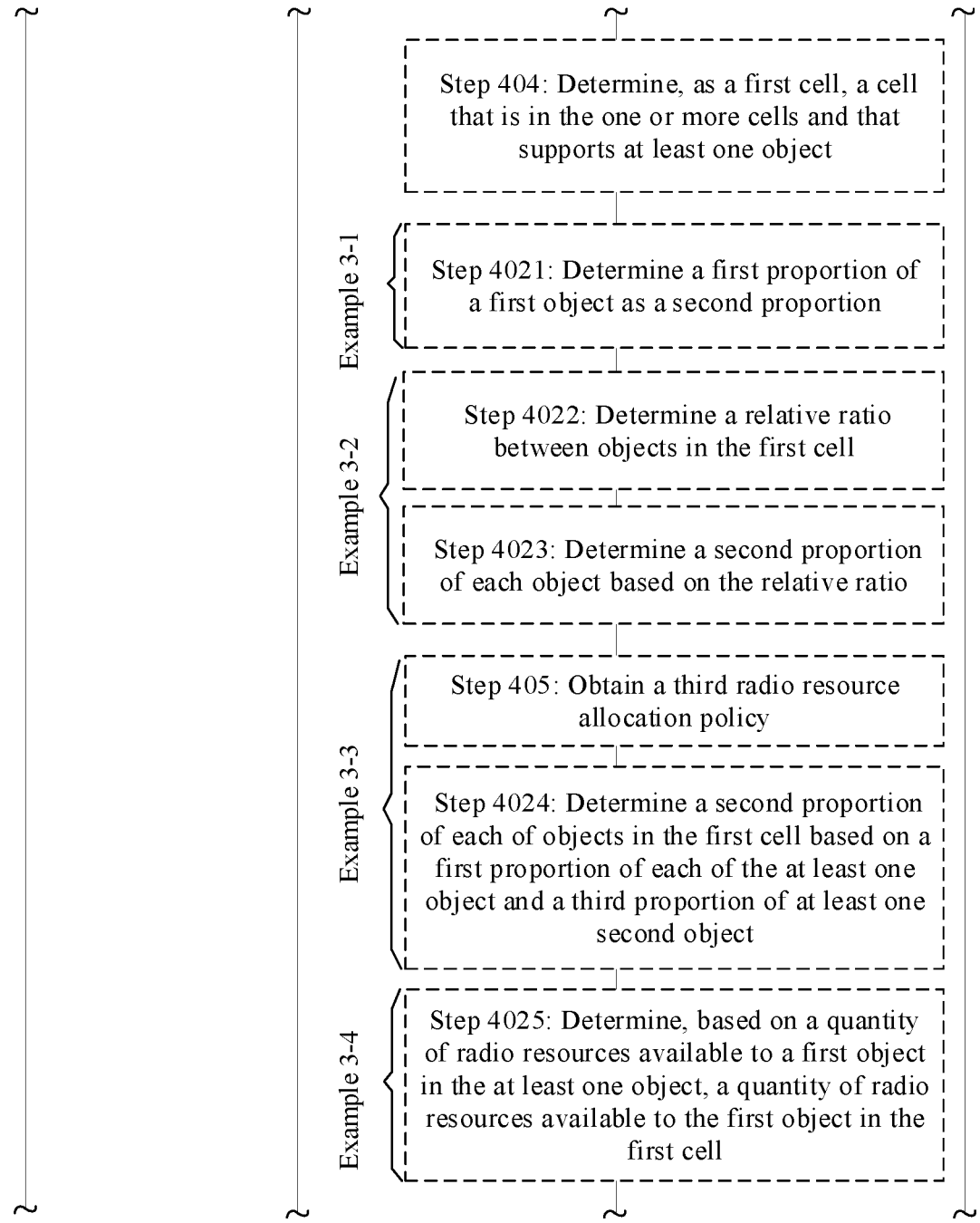
Figure 10C:
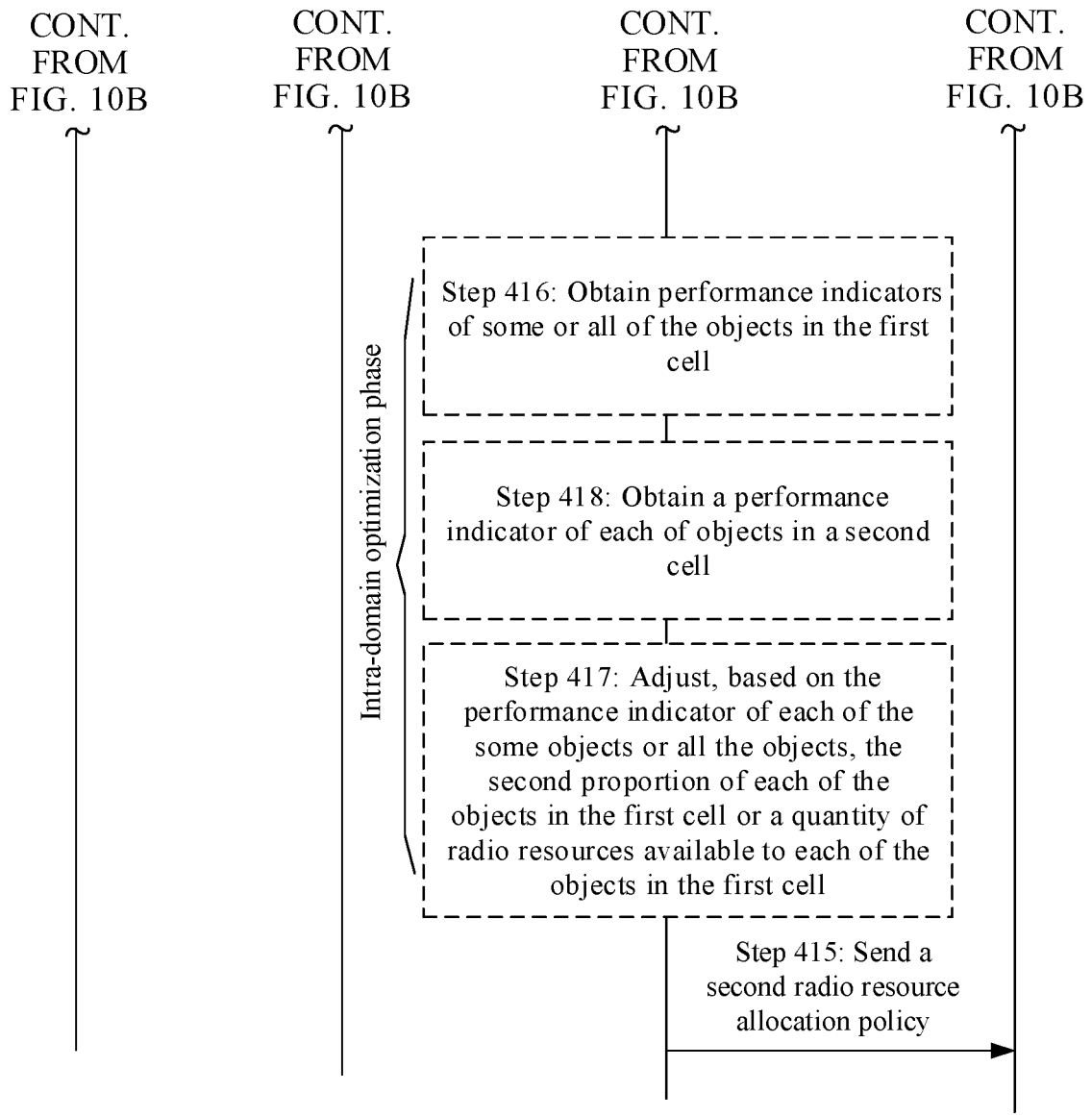

Specifically, in an embodiment shown in FIG. 10A to FIG. 10C, for a specific implementation of step 406, refer to the specific implementation of step 406 in the embodiment shown in FIG. 9A and FIG. 9B.

In a possible embodiment, step 409 in this embodiment of this application may be replaced with the following manner: The second network management unit 20 sends, to the service operation system 30, a performance indicator of at least one of an object supported by the first subnetwork, so that the service operation system 30 receives the performance indicator of the at least one of the object supported by the first subnetwork. Step 410 may be replaced with the following manner: The service operation system 30 adjusts the radio resource allocation policy based on the performance indicator of the at least one of the object supported by the first subnetwork. Correspondingly, step 411 in this embodiment of this application may be replaced with the following manner: The service operation system 30 sends an adjusted radio resource allocation policy to the second network management unit 20.

(Example 4-2-3): In a cross-domain optimization phase, the first information is the adjusted radio resource allocation policy, and the second network management unit 20 adjusts the fourth radio resource allocation policy of the first network.

In a possible embodiment, as shown in FIG. 11A, before step 406, the method in this embodiment of this application may further include the following step.

Step 412: The first network management unit 10 sends, to the second network management unit 20, a performance indicator of at least one of an object supported by the first subnetwork, so that the second network management unit 20 receives the performance indicator of the at least one of the object supported by the first subnetwork of the first network management unit. The performance indicator includes any one or more of the following: a quantity of terminals, a quantity of registered terminals, a throughput, throughput distribution, a delay, and a quantity of radio resource control RRC connections. The second network management unit 20 is configured to adjust the radio resource allocation policy based on the performance indicator of at least one object.

It should be noted that if the second network management unit 20 can autonomously obtain the performance indicator of the at least one object supported by the first subnetwork, step 412 in which the first network management unit 10 sends, to the second network management unit 20, the performance indicator of the at least one object supported by the first subnetwork may be omitted.

In a possible implementation, before step 412, the method provided in this embodiment of this application may further include: The first network management unit 10 obtains, from a base station corresponding to a cell to which each of the at least one object supported by the first subnetwork belongs, the performance indicator of the at least one object supported by the first subnetwork. In this embodiment of this application, a performance indicator of an object may be actively sent by a base station corresponding to the object to the first network management unit 10, or may be sent by the base station to the first network management unit 10 after the first network management unit 10 requests the base station corresponding to the object. This is not limited in this embodiment of this application.

Correspondingly, step 406 in this embodiment of this application may be specifically implemented in the following manner: The second network management unit 20 adjusts the radio resource allocation policy based on the performance indicator of the at least one object, to obtain an adjusted radio resource allocation policy.

Specifically, step 406 may be implemented in the following manner: The second network management unit 20 adjusts the radio resource allocation policy if the second network management unit 20 determines, based on the performance indicator of the at least one object, that utilization of the first radio resource is less than or equal to a fourth threshold or that any one or more objects whose performance indicators less than a preset performance threshold exist in the at least one object. Alternatively, if performance indicators of all objects supported by the first subnetwork are less than the preset performance threshold, the second network management unit 20 adjusts the radio resource allocation policy. Correspondingly, step 407 in FIG. 11A may be specifically implemented in the following manner: sending the adjusted radio resource allocation policy to the first network management unit 10.

(Example 4-2-4): In an intra-domain optimization phase, the first network management unit 10 adjusts the radio resource allocation policy of the first subnetwork.

Figure 12A:
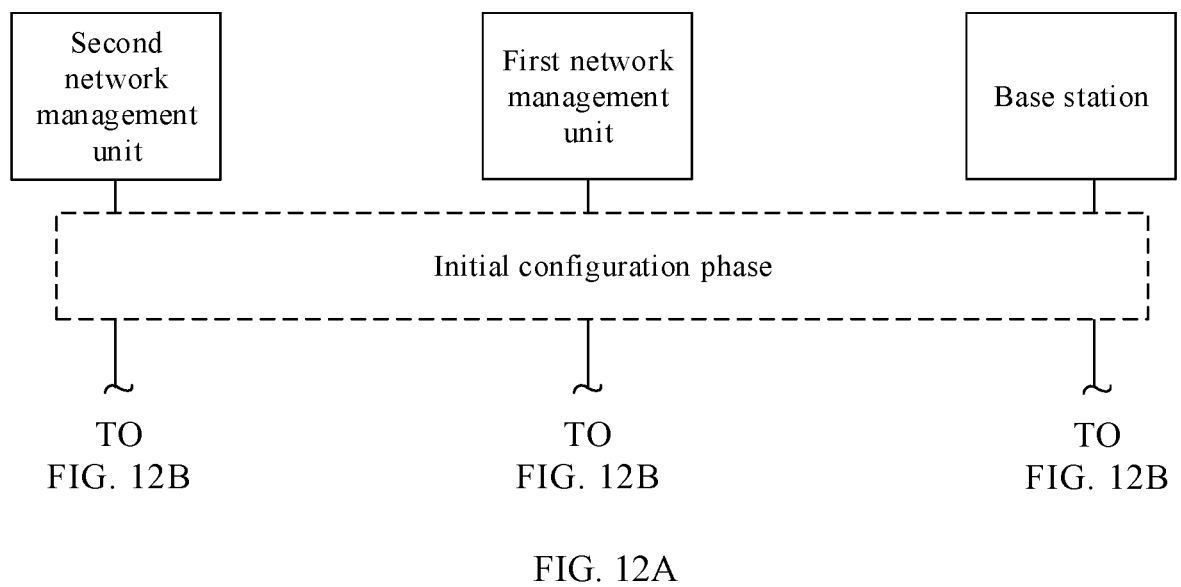
Figure 12B:
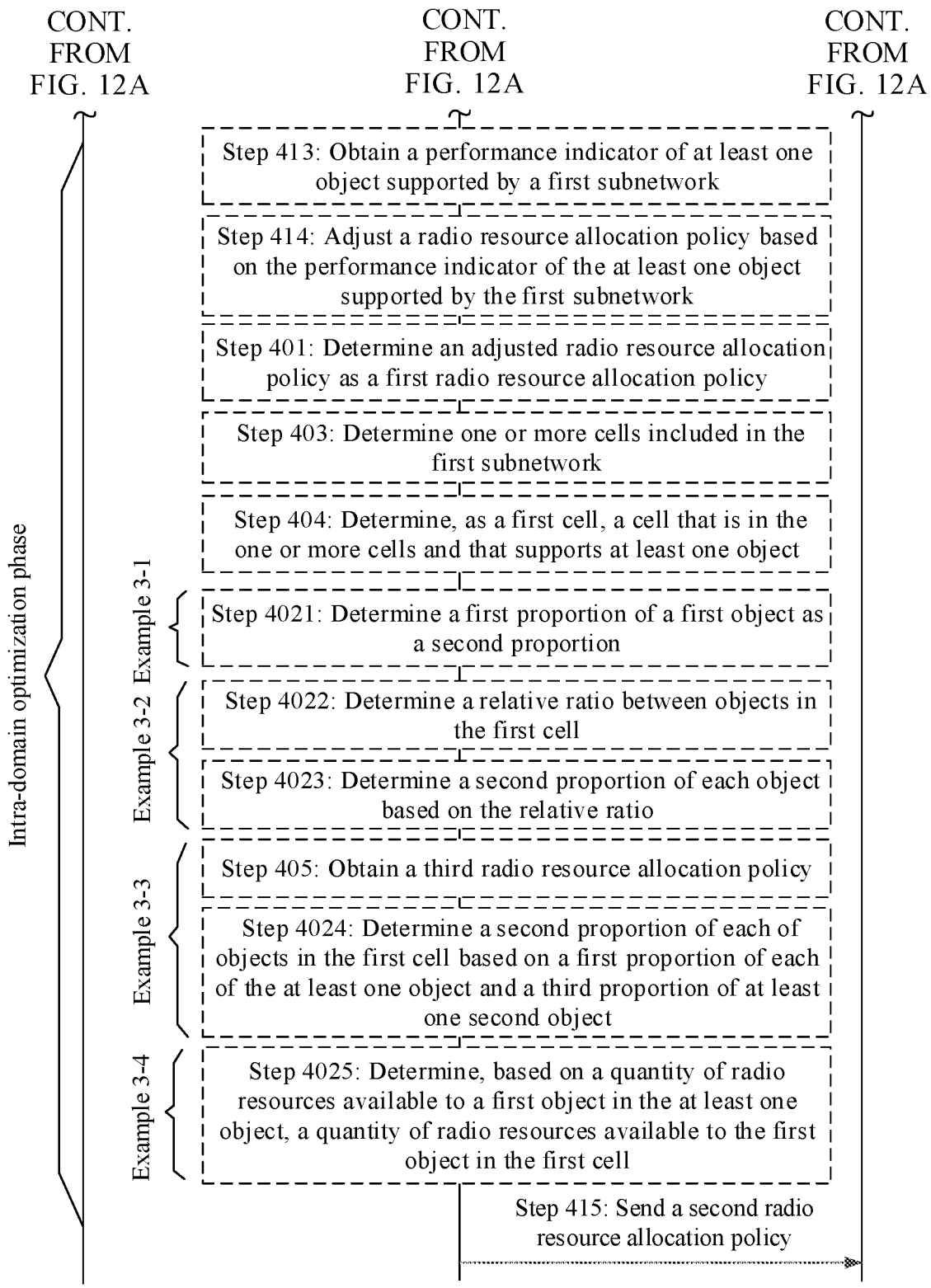

In a possible embodiment, as shown in FIG. 12B, before step 401, the method provided in this embodiment of this application may further include the following steps.

Step 413: The first network management unit 10 obtains a performance indicator of at least one object supported by the first subnetwork.

For example, step 413 in this embodiment of this application may be implemented in the following manner: The first network management unit 10 determines one or more cells included in the first subnetwork, and the first network management unit 10 obtains, from a base station to which the one or more cells belong, the performance indicator of the at least one object supported by the first subnetwork.

Step 414: The first network management unit 10 adjusts the radio resource allocation policy based on the performance indicator of the at least one object supported by the first subnetwork.

In the solution in which the first network management unit 10 adjusts the radio resource allocation policy of the first subnetwork, the radio resource allocation policy may be preconfigured in the first network management unit 10, or may be obtained by the first network management unit 10 from the second network management unit 20 in the initial configuration phase. This is not limited in this embodiment of this application.

In a possible implementation, step 414 in this embodiment of this application may be implemented in the following manner: The first network management unit 10 determines utilization of the first radio resource based on the performance indicator of the at least one object. If the utilization of the first radio resource is less than a third threshold, the first network management unit 10 adjusts the radio resource allocation policy.

Correspondingly, step 401 in this embodiment of this application may be implemented in the following manner: The first network management unit 10 determines an adjusted radio resource allocation policy as the first radio resource allocation policy.

In a possible embodiment, with reference to any one of FIG. 8A to FIG. 12B, before step 402, the method provided in this embodiment of this application may further include the following step.

Step 415: The first network management unit 10 sends the second radio resource allocation policy to a base station to which the first cell belongs, so that the base station receives the second radio resource allocation policy of the first cell. It should be understood that after step 415, the base station may configure the second radio resource allocation policy for the first cell.

In a possible embodiment, with reference to any one of FIG. 8A to FIG. 12B, before step 402, the method provided in this embodiment of this application may further include the following steps.

Step 416: The first network management unit 10 obtains performance indicators of some or all of the objects in the first cell. The performance indicator includes any one or more of the following: a quantity of terminals, a quantity of registered terminals, a throughput, throughput distribution, a delay, and a quantity of radio resource control RRC connections.

Specifically, step 416 may be implemented in the following manner: The first network management unit 10 obtains, from the base station to which the first cell belongs, the performance indicators of the some or all of the objects in the first cell. For example, the first network management unit 10 may send a request message to the base station to which the first cell belongs, where the request message is used to request the performance indicators of the some or all of the objects in the first cell. The request message may carry identifiers of the some or all of the objects in the first cell.

Step 417: The first network management unit 10 adjusts, based on the performance indicator of each of the some objects or all the objects, the second proportion of each of the objects in the first cell or the quantity of radio resources available to each of the objects in the first cell.

In a possible implementation, step 417 in this embodiment of this application may be implemented in the following Manner 1 and Manner 2.

Manner 1: The first network management unit 10 determines effective utilization of radio resources of the some objects or all the objects based on the performance indicators of the some objects or all the objects and radio resources available to the some objects or all the objects.

It should be understood that effective utilization of a radio resource available to any of the some objects or all the objects may be obtained by dividing a radio resource actually used by the object in the second radio resource by a radio resource available to the object in the second radio resource. For example, a quantity of terminals available to the network slice 1 that are registered in the second radio resource is 10000, and a quantity of terminals actually registered with the network slice 1 in the second radio resource is 1000.

Manner 2: The first network management unit 10 adjusts the second proportion of each of the object supported by the first cell based on the effective utilization of the radio resources of the some objects or all the objects, where the total sum of available radio resources allocated to all of the objects in the first cell based on an adjusted second proportion is less than or equal to a size of the second radio resource.

In a possible implementation, Manner 2 may be specifically implemented in the following manner: If the first network management unit 10 determines, based on the performance indicators of the some objects or all the objects, that any object whose radio resource has effective utilization less than a first threshold exists in the some objects or all the objects, the first network management unit decreases a second proportion of the any object or a quantity of radio resources available to the any object. Alternatively, if any object whose radio resource has effective utilization greater than a second threshold exists in the some objects or all the objects, the first network management unit increases a second proportion of the any object or a quantity of radio resources available to the any object.

For example, the first network management unit 10 adjusts the second radio resource allocation policy on the premise that the first network management unit 10 finds, based on performance indicators of different objects in the first cell, that the second radio resource is not effectively used. For example, some objects A are allocated with many radio resources, but a quantity of terminals accessed to the object A is less than a terminal quantity threshold corresponding to the object A. However, another object B is allocated with few resources, but a quantity of terminals accessed to the object B is greater than or equal to a terminal quantity threshold corresponding to the object B.

In a possible implementation, before step 417, the method provided in this embodiment of this application may further include the following step:

Step 418: The first network management unit 10 obtains a performance indicator of each of one or more objects in a second cell, where the second cell is also a cell of the first subnetwork.

Correspondingly, based on step 418, step 417 in this embodiment of this application may be implemented in the following manner: The first network management unit 10 adjusts, based on the performance indicator of each of the some objects or all the objects and the performance indicator of each of the objects in the second cell, the second proportion of each of the objects in the first cell or the quantity of radio resources available to each of the objects in the first cell.

The foregoing mainly describes the solutions in the embodiments of this application from a perspective of interaction between the network elements. It can be understood that to implement the foregoing functions, each network element, such as the first network management unit, the second network management unit, or the service operation system, includes a corresponding hardware structure and/or software module that performs each function. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the first network management unit, the second network management unit, or the service operation system may be divided into functional units based on the foregoing method examples. For example, each functional module corresponding to each function may be obtained through division, or two or more functions may be integrated into one processing unit. The integrated unit may be implemented in a form of hardware, or may be implemented in a form of a software functional unit. It should be noted that, in the embodiments of this application, division into units is an example, and is merely logical function division. In actual implementation, another division manner may be used.

The foregoing describes the methods in the embodiments of this application with reference to FIG. 4 to FIG. 12B. The following describes a communications apparatus that is provided in embodiments of this application and that performs the foregoing methods. A person skilled in the art may understand that the method and the apparatus may be combined with each other and reference to each other. A communications apparatus provided in the embodiments of this application may perform steps performed by the first network management unit, the second network management unit, and the service operation system in the foregoing communication method.

Figure 13:
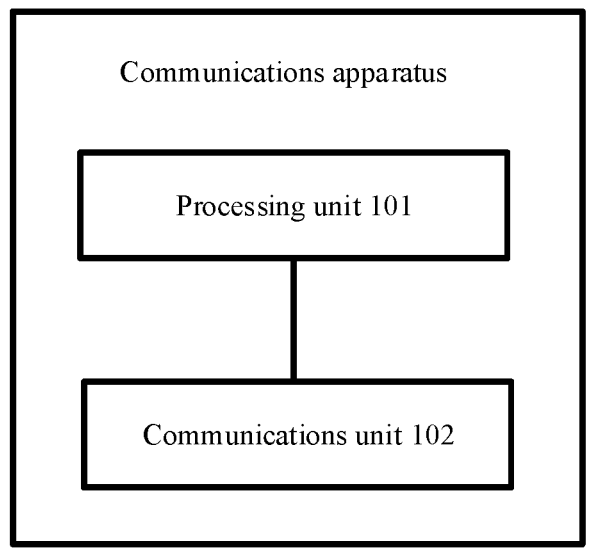
FIG. 13 is a schematic diagram of a structure of a communications apparatus according to an embodiment of this application.

When an integrated unit is used, FIG. 13 shows a communications apparatus in the foregoing embodiment. The communications apparatus may include a communications unit 102 and a processing unit 101.

In an example, the communications apparatus is the first network management unit, or is a chip applied to the first network management unit. In this case, the processing unit 101 is configured to support the communications apparatus in performing step 401 and step 402 that are performed by the first network management unit in the foregoing embodiment.

In a possible embodiment, the processing unit 101 is further configured to support the communications apparatus in performing step 403, step 404, step 4021, step 4022, step 4023, step 4024, step 414, and step 417 in the foregoing embodiment.

The communications unit 102 is configured to support the communications apparatus in performing step 405, step 413, step 416, step 415, and step 418 in the foregoing embodiment. The communications unit 102 is configured to support the communications apparatus in performing the receiving action performed by the first network management unit in step 407 and the sending action performed by the first network management unit 10 in step 412 in the foregoing embodiment.

In another example, the communications apparatus is the second network management unit, or is a chip applied to the second network management unit. In this case, the processing unit 101 is configured to support the communications apparatus in performing step 406 in the foregoing embodiment. The communications unit 102 is configured to support the communications apparatus in performing the sending action performed by the second network management unit in step 407 in the foregoing embodiment.

In a possible embodiment, the communications unit 102 is further configured to perform, by the communications apparatus, the receiving actions performed by the second network management unit in step 408 and step 412 in the foregoing embodiment.

In a possible embodiment, the communications unit 102 is further configured to perform, by the communications apparatus, the sending action performed by the second network management unit in step 409 in the foregoing embodiment.

In still another example, the communications apparatus is the service operation system, or is a chip applied to the service operation system. The communications unit 102 is configured to support the communications apparatus in performing the sending action performed by the service operation system in step 608 in the foregoing embodiment.

In a possible embodiment, the communications unit 102 is further configured to perform, by the communications apparatus, the receiving action performed by the service operation system in step 409 in the foregoing embodiment. The processing unit 101 is further configured to support the communications apparatus in performing step 410 in the foregoing embodiment. The communications unit 102 is further configured to perform, by the communications apparatus, the sending action performed by the service operation system in step 411 in the foregoing embodiment.

Figure 14:
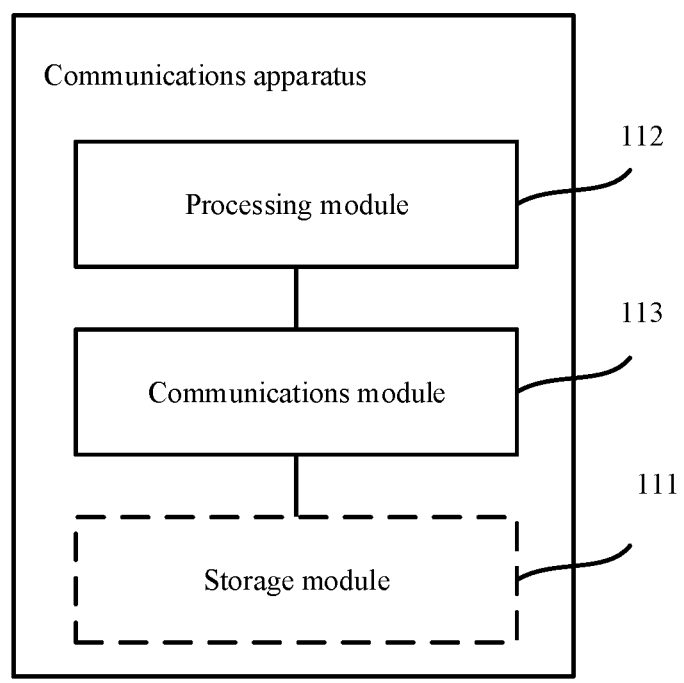
FIG. 14 is a schematic diagram of a structure of another communications apparatus according to an embodiment of this application.

When an integrated unit is used, FIG. 14 is a schematic diagram of a possible logical structure of the communications apparatus in the foregoing embodiments. The communications apparatus includes a processing module 112 and a communications module 113. The processing module 112 is configured to control and manage actions of the communications apparatus. For example, the processing module 112 is configured to perform a step of information/data processing performed by the communications apparatus. The communications module 113 is configured to support the communications apparatus in performing an information/data sending or receiving step.

In a possible embodiment, the communications apparatus may further include a storage module 111, configured to store program code and data of the communications apparatus.

In an example, the communications apparatus is the first network management unit, or is a chip applied to the first network management unit. In this case, the processing module 112 is configured to support the communications apparatus in performing step 401 and step 402 that are performed by the first network management unit in the foregoing embodiment.

In a possible embodiment, the processing module 112 is further configured to support the communications apparatus in performing step 403, step 404, step 4021, step 4022, step 4023, step 4024, step 414, and step 417 in the foregoing embodiment.

The communications module 113 is configured to support the communications apparatus in performing step 405, step 413, step 416, step 415, and step 418 in the foregoing embodiment. The communications module 113 is configured to support the communications apparatus in performing the receiving action performed by the first network management unit in step 407 and the sending action performed by the first network management unit 10 in step 412 in the foregoing embodiment.

In another example, the communications apparatus is the second network management unit, or is a chip applied to the second network management unit. In this case, the processing module 112 is configured to support the communications apparatus in performing step 406 in the foregoing embodiment. The communications module 113 is configured to support the communications apparatus in performing the sending action performed by the second network management unit in step 407 in the foregoing embodiment.

In a possible embodiment, the communications module 113 is further configured to perform, by the communications apparatus, the receiving actions performed by the second network management unit in step 408 and step 412 in the foregoing embodiment.

In a possible embodiment, the communications module 113 is further configured to perform, by the communications apparatus, the sending action performed by the second network management unit in step 409 in the foregoing embodiment.

In still another example, the communications apparatus is the service operation system, or is a chip applied to the service operation system. The communications module 113 is configured to support the communications apparatus in performing the sending action performed by the service operation system in step 608 in the foregoing embodiment.

In a possible embodiment, the communications module 113 is further configured to perform, by the communications apparatus, the receiving action performed by the service operation system in step 409 in the foregoing embodiment. The processing module 112 is further configured to support the communications apparatus in performing step 410 in the foregoing embodiment. The communications module 113 is further configured to perform, by the communications apparatus, the sending action performed by the service operation system in step 411 in the foregoing embodiment.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communications module 113 may be a transceiver, a transceiver circuit, a communications interface, or the like. The storage module 111 may be a memory.

When the processing module 112 is the processor 31 or the processor 35, the communications module 113 is the communications interface 33, and the storage module 111 is the memory 32, the communications apparatus in this application may be the communications device shown in FIG. 3.

Figure 15:
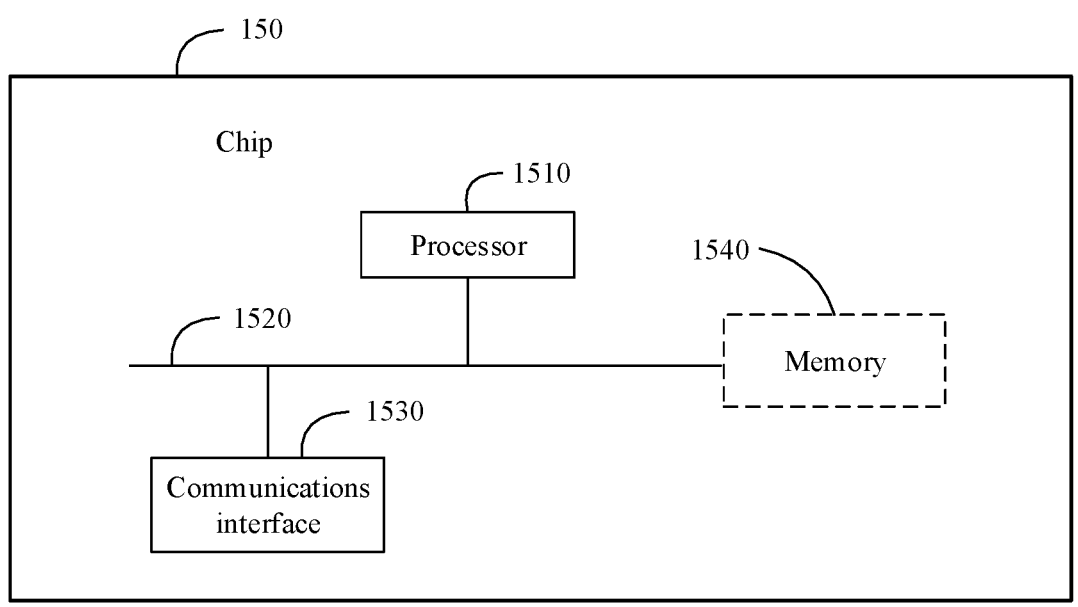
FIG. 15 is a schematic diagram of a structure of a chip according to an embodiment of this application.

FIG. 15 is a schematic diagram of a structure of a chip 150 according to an embodiment of this application. The chip 150 includes one or more (including two) processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (non-volatile random access memory, NVRAM).

In some implementations, the memory 1540 stores the following element: an executable module or a data structure, a subset thereof, or an extended set thereof In this embodiment of this application, the operation instructions stored in the memory 1540 (where the operation instructions may be stored in an operating system) is invoked to perform a corresponding operation.

In a possible implementation, the chips used in the second network management unit, the first network management unit, and the service operation system have similar structures, and different apparatuses may use different chips to implement their respective functions.

The processor 1510 controls a processing operation of any one of the second network management unit, the first network management unit, and the service operation system, and the processor 1510 may be further referred to as a central processing unit (central processing unit, CPU).

The memory 1540 may include a read-only memory and a random access memory, and provide instructions and data for the processor 1510. A part of the memory 1540 may further include an NVRAM. For example, in an application, the memory 1540, the communications interface 1530, and the memory 1540 are coupled together through a bus system 1520. The bus system 1520 may further include a power bus, a control bus, a status signal bus, and the like in addition to a data bus. However, for clear description, various types of buses in FIG. 15 are marked as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, the steps in the foregoing method may be implemented by using a hardware integrated logical circuit in the processor 1510, or by using an instruction in a form of software. The processor 1510 may be a general-purpose processor, a digital signal processor (digital signal processing, DSP), an ASIC, a field programmable gate array (field programmable gate array, FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communications interface 1530 is configured to perform the receiving and sending steps of the second network management unit, the first network management unit, and the service operation system in the embodiments shown in FIG. 4 to FIG. 12B. The processor 1510 is configured to perform the steps processed by the second network management unit, the first network management unit, and the service operation system in the embodiments shown in FIG. 4 to FIG. 12B.

The communications unit may be a communications interface of the apparatus, and is configured to receive a signal from another apparatus. For example, when the apparatus is implemented in a chip manner, the communications unit is a communications interface that is used by the chip to receive a signal from another chip or apparatus or send a signal to another chip or apparatus.

According to one aspect, a computer-readable storage medium is provided, and the computer-readable storage medium stores instructions. When the instructions are run, functions of the second network management unit in FIG. 4 to FIG. 12B are implemented.

According to another aspect, a computer-readable storage medium is provided, and the computer-readable storage medium stores instructions. When the instructions are run, functions of the first network management unit in FIG. 4 to FIG. 12B are implemented.

According to one aspect, a computer-readable storage medium is provided, and the computer-readable storage medium stores instructions. When the instructions are run, functions of the service operation system in FIG. 4 to FIG. 12B are implemented.

According to another aspect, a computer program product including instructions is provided, and the computer program product includes the instructions. When the instructions are run, functions of the service operation system in FIG. 4 to FIG. 12B are implemented.

According to another aspect, a computer program product including instructions is provided, and the computer program product includes the instructions. When the instructions are run, functions of the first network management unit in FIG. 4 to FIG. 12B are implemented.

According to another aspect, a computer program product including instructions is provided, and the computer program product includes the instructions. When the instructions are run, functions of the second network management unit in FIG. 4 to FIG. 12B are implemented.

According to one aspect, a chip is provided, and the chip is applied to the second network management unit. The chip includes at least one processor and a communications interface, the communications interface is coupled to at least one processor, and the processor is configured to run instructions to implement functions of the second network management unit in FIG. 4 to FIG. 12B.

According to another aspect, a chip is provided, and the chip is applied to the first network management unit. The chip includes at least one processor and a communications interface, the communications interface is coupled to at least one processor, and the processor is configured to run instructions to implement functions of the first network management unit in FIG. 4 to FIG. 12B.

According to another aspect, a chip is provided, and the chip is applied to the service operation system. The chip includes at least one processor and a communications interface, the communications interface is coupled to at least one processor, and the processor is configured to run instructions to implement functions of the service operation system in FIG. 4 to FIG. 12B.

An embodiment of this application provides a communications system, and the communications system includes a first network management unit and a second network management unit. The first network management unit is configured to perform any step performed by the first network management unit in FIG. 4 to FIG. 12B, and the second network management unit is configured to perform any step performed by the second network management unit in FIG. 4 to FIG. 12B.

In a possible communications system, the communications system may further include a service operation system. The service operation system is configured to perform any step performed by the service operation system in FIG. 4 to FIG. 12B.

All or some of the foregoing embodiments may be implemented by using software, hardware, firmware, or any combination thereof When software is used to implement the embodiments, all or some of the embodiments may be implemented in a form of a computer program product. The computer program product includes one or more computer programs or instructions. When the computer programs or instructions are loaded and executed on a computer, all or some of the procedure or functions according to the embodiments of this application are generated. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (digital video disc, DVD), or may be a semiconductor medium, for example, a solid-state drive (solid-state drive, SSD).

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A radio resource allocation policy configuration method, comprising:
    obtaining, by a first network management unit, a first radio resource allocation policy, wherein the first radio resource allocation policy describes a first proportion, wherein the first proportion is a proportion of a radio resource that is available to each of one or more objects in a first subnetwork, to a first radio resource of the first subnetwork, or the first radio resource allocation policy describes a quantity of the radio resource available to each of the one or more objects in the first subnetwork, wherein each of the one or more objects in the first subnetwork comprises one or more of: subnetwork requirement information, a network slice, a service, a tenant, or a public land mobile network; and
    determining, by the first network management unit, a second radio resource allocation policy based on the first radio resource allocation policy, wherein the second radio resource allocation policy describes a second proportion, wherein the second proportion is a proportion of a radio resource that is available to each of one or more objects in a first cell, to a second radio resource of the first cell, or the second radio resource allocation policy describes a quantity of the radio resources available to each of the one or more objects in the first cell, and wherein the one or more objects in the first cell comprise at least one object of the one or more objects in the first subnetwork, and the first cell is a cell of the first subnetwork.

2. The method according to claim 1, wherein the one or more objects in the first cell are the same as the one or more objects in the first subnetwork; and
    the second proportion that is of a first object in the one or more objects in the first cell and that is in the second radio resource, is the same as the first proportion of the first object in the first radio resource, and the first object is any of the one or more objects in the first cell.

3. The method according to claim 1, wherein the at least one object of the one or more objects in the first subnetwork is all objects in the first cell, and determining, by the first network management unit, the second radio resource allocation policy based on the first radio resource allocation policy comprises:
    determining, by the first network management unit, a relative ratio between the one or more objects in the first cell based on a first proportion of each of the at least one object of the one or more objects in the first subnetwork; and
    determining, by the first network management unit, a second proportion of each of the one or more objects in the first cell based on the relative ratio between the one or more objects in the first cell.

4. The method according to claim 1, wherein the one or more objects in the first cell further comprise at least one second object in one or more objects in a second subnetwork, and the method further comprises:
    obtaining, by the first network management unit, a third radio resource allocation policy, wherein the third radio resource allocation policy describes a third proportion that is of the object in the second subnetwork and that is in a third radio resource of the second subnetwork; and
    the determining, by the first network management unit, a second radio resource allocation policy based on the first radio resource allocation policy comprises:
    determining, by the first network management unit, a second proportion of each of the one or more objects in the first cell based on a first proportion of each of the at least one object of the one or more objects in the first subnetwork and the third proportion of the at least one second object.

5. The method according to claim 1, wherein the method further comprises:
    obtaining, by the first network management unit, performance indicators of at least one of the one or more objects in the first cell, wherein the performance indicator comprises any one or more of the following: a quantity of terminals, a quantity of registered terminals, a throughput, throughput distribution, a delay, and a quantity of radio resource control (RRC) connections; and
    adjusting, by the first network management unit based on the performance indicator of each of some objects or all the objects, the second proportion of each of the one or more objects in the first cell or the quantity of radio resources available to each of the one or more objects in the first cell.

6. The method according to claim 1, wherein the obtaining, by a first network management unit, a first radio resource allocation policy comprises:
    receiving, by the first network management unit, first information from a second network management unit, wherein the first information is used to determine the first radio resource allocation policy, and the first information is a radio resource allocation policy of the first subnetwork or the first information is an adjusted radio resource allocation policy; and determining, by the first network management unit, the first radio resource allocation policy based on the first information.

7. The method according to claim 6, wherein the first information is the adjusted radio resource allocation policy, and before the receiving, by the first network management unit, first information from a second network management unit, the method further comprises:

sending, by the first network management unit to the second network management unit, a performance indicator of at least one object supported by the first subnetwork, wherein the performance indicator comprises any one or more of the following: a quantity of terminals, a quantity of registered terminals, a throughput, throughput distribution, a delay, and a quantity of RRC connections; and the second network management unit is configured to adjust the radio resource allocation policy based on the performance indicator of the at least one object supported by the first subnetwork.

8. The method according to claim 1, wherein the obtaining, by a first network management unit, a first radio resource allocation policy comprises:

adjusting, by the first network management unit, a radio resource allocation policy based on a performance indicator of at least one object supported by the first subnetwork; and determining, by the first network management unit, an adjusted radio resource allocation policy as the first radio resource allocation policy.

9. The method according to claim 8, wherein the adjusting, by the first network management unit, a radio resource allocation policy based on a performance indicator of at least one object supported by the first subnetwork comprises:

determining, by the first network management unit, utilization of the first radio resource based on the performance indicator of the at least one object; and in response to determining that the utilization of the first radio resource is less than a third threshold, adjusting, by the first network management unit, the radio resource allocation policy.

10. A communications apparatus, comprising:

at least one processor; and one or more memories coupled to the at least one processor and storing programming instructions for execution by the at least one processor to:

obtain a first radio resource allocation policy, wherein the first radio resource allocation policy describes a first proportion, wherein the first proportion is a proportion of a radio resource that is available to each of one or more objects in a first subnetwork, to a first radio resource of the first subnetwork, or the first radio resource allocation policy describes a quantity of the radio resource available to each of the one or more objects in the first subnetwork, wherein each of the one or more objects in the first subnetwork comprises one or more of: subnetwork requirement information, a network slice, a service, a tenant, or a public land mobile network; and determine a second radio resource allocation policy based on the first radio resource allocation policy, wherein the second radio resource allocation policy describes a second proportion, wherein the second proportion is a proportion of a radio resource that is available to each of one or more objects in a first cell, to a second radio resource of the first cell, or the second radio resource allocation policy describes a quantity of the radio resources available to each of the one or more objects in the first cell, and wherein the one or more objects in the first cell comprise at least one object of the one or more objects in the first subnetwork, and the first cell is a cell of the first subnetwork.

11. The communications apparatus according to claim 10, wherein the one or more objects in the first cell are the same as the one or more objects in the first subnetwork; and a second proportion that is of a first object in the one or more objects in the first cell and that is in the second radio resource, is the same as a first proportion of the first object in the first radio resource, and the first object is any of the one or more objects in the first cell.

12. The communications apparatus according to claim 10, wherein the at least one object of the one or more objects in the first subnetwork is all objects in the first cell, and determining the second radio resource allocation policy based on the first radio resource allocation policy comprises:

determining a relative ratio between the one or more objects in the first cell based on a first proportion of each of the at least one object of the one or more objects in the first subnetwork; and determining a second proportion of each of the one or more objects in the first cell based on the relative ratio between the one or more objects in the first cell.

13. The communications apparatus according to claim 10, wherein the one or more objects in the first cell further comprise at least one second object in one or more objects in a second subnetwork, and wherein the programming instructions, when executed by the at least one processor, further cause the apparatus to:

Obtain a third radio resource allocation policy, wherein the third radio resource allocation policy describes a third proportion that is of the object in the second subnetwork and that is in a third radio resource of the second subnetwork; and the determining a second radio resource allocation policy based on the first radio resource allocation policy comprises:

determining a second proportion of each of the one or more objects in the first cell based on a first proportion of each of the at least one object of the one or more objects in the first subnetwork and the third proportion of the at least one second object.

14. The communications apparatus according to claim 10, wherein the programming instructions, when executed by the at least one processor, further cause the apparatus to:

obtain performance indicators of at least one of the one or more objects in the first cell, wherein the performance indicator comprises any one or more of the following: a quantity of terminals, a quantity of registered terminals, a throughput, throughput distribution, a delay, and a quantity of radio resource control (RRC) connections; and adjust, based on the performance indicator of each of some objects or all the objects, the second proportion of each of the one or more objects in the first cell or the quantity of radio resources available to each of the one or more objects in the first cell.

15. The communications apparatus according to claim 14, wherein the adjusting, based on the performance indicator of each of the some objects or all the objects, the second proportion of each of the one or more objects in the first cell or the quantity of radio resources available to each of the one or more objects in the first cell comprises:

in response to determining, based on the performance indicators of the some objects or all the objects, that any object whose radio resource has effective utilization less than a first threshold exists in the some objects or all the objects, decreasing a second proportion of the any object or a quantity of radio resources available to the any object; or in response to determining that any object whose radio resource has effective utilization greater than a second threshold exists in the some objects or all the objects, increasing a second proportion of the any object or a quantity of radio resources available to the any object.

16. The communications apparatus according to claim 14, wherein the programming instructions, when executed by the at least one processor, further cause the communications apparatus to:

obtain a performance indicator of each of one or more objects in a second cell, wherein the second cell is also a cell of the first subnetwork; and the adjusting, based on the performance indicator of each of the some objects or all the objects, the second proportion of each of the one or more objects in the first cell or the quantity of radio resources available to each of the one or more objects in the first cell comprises:

adjusting, based on the performance indicator of each of the some objects or all the objects and the performance indicator of each of the objects in the second cell, the second proportion of each of the one or more objects in the first cell or the quantity of radio resources available to each of the one or more objects in the first cell.

17. The communications apparatus according to claim 10, wherein the obtaining a first radio resource allocation policy comprises:

receiving first information from a second network management unit, wherein the first information is used to determine the first radio resource allocation policy, and the first information is a radio resource allocation policy of the first subnetwork or the first information is an adjusted radio resource allocation policy; and determining the first radio resource allocation policy based on the first information.

18. The communications apparatus according to claim 17, wherein the first information is the adjusted radio resource allocation policy, and wherein the programming instructions, when executed by the at least one processor, further cause the communications apparatus to:

before receiving the first information from the second network management unit, send, to the second network management unit, a performance indicator of at least one object supported by the first subnetwork, wherein the performance indicator comprises any one or more of the following: a quantity of terminals, a quantity of registered terminals, a throughput, throughput distribution, a delay, and a quantity of RRC connections; and the second network management unit is configured to adjust the radio resource allocation policy based on the performance indicator of the at least one object supported by the first subnetwork.

19. The communications apparatus according to claim 10, wherein the obtaining a first radio resource allocation policy comprises:

adjusting a radio resource allocation policy based on a performance indicator of at least one object supported by the first subnetwork; and determining an adjusted radio resource allocation policy as the first radio resource allocation policy.

20. A non-transitory computer-readable medium storing computer instructions, that when executed by one or more processors, cause a computer device to perform operations comprising:

obtaining a first radio resource allocation policy, wherein the first radio resource allocation policy describes a first proportion, wherein the first proportion is a proportion of a radio resource that is available to each of one or more objects in a first subnetwork, to a first radio resource of the first subnetwork, or the first radio resource allocation policy describes a quantity of the radio resource available to each of the one or more objects in the first subnetwork, wherein each of the one or more objects in the first subnetwork comprises one or more of: subnetwork requirement information, a network slice, a service, a tenant, or a public land mobile network; and determining a second radio resource allocation policy based on the first radio resource allocation policy, wherein the second radio resource allocation policy describes a second proportion, wherein the second proportion is a proportion of a radio resource that is available to each of one or more objects in a first cell, to a second radio resource of the first cell, or the second radio resource allocation policy describes a quantity of the radio resources available to each of the one or more objects in the first cell, and wherein the one or more objects in the first cell comprise at least one object of the one or more objects in the first subnetwork, and the first cell is a cell of the first subnetwork.

* * * * *